US012657450B2

(12) United States Patent
Kusaka et al.

(10) Patent No.: US 12,657,450 B2
(45) Date of Patent: Jun. 16, 2026

(54) OPTICAL COMPUTING DEVICE AND OPTICAL COMPUTING METHOD

(71) Applicant: FUJIKURA LTD., Tokyo (JP)

(72) Inventors: Hiroyuki Kusaka, Tokyo (JP);
Masahiro Kashiwagi, Tokyo (JP);
Yuichiro Kunai, Tokyo (JP)

(73) Assignee: Fujikura Ltd., Tokyo (JP)

( * ) Notice: Subject to any disclaimer, the term of this
patent is extended or adjusted under 35
U.S.C. 154(b) by 1164 days.

(21) Appl. No.: 17/634,403

(22) PCT Filed: Jun. 15, 2021

(86) PCT No.: PCT/JP2021/022686
§ 371 (c)(1),
(2) Date: Feb. 10, 2022

(87) PCT Pub. No.: WO2022/264261
PCT Pub. Date: Dec. 22, 2022

(65) Prior Publication Data
US 2023/0359880 A1    Nov. 9, 2023

(51) Int. Cl.
*G02F 1/035* (2006.01)
*G06N 3/067* (2006.01)
(52) U.S. Cl.
CPC .................................. *G06N 3/0675* (2013.01)
(58) Field of Classification Search
CPC ......... G06N 3/0675; G06E 3/005; G02F 3/00;
G02F 1/035
See application file for complete search history.

(56) References Cited

U.S. PATENT DOCUMENTS 5,704,015 A * 12/1997 Ono ..................... G06N 3/0675
                                                        359/107
7,773,291 B2    8/2010 Smith
                  (Continued)

FOREIGN PATENT DOCUMENTS

CN        111630447 a      9/2020
JP        S6374041 A       4/1988
                  (Continued)

OTHER PUBLICATIONS

International Preliminary Report on Patentability issued in corre-
sponding International Application No. PCT/JP2021/022686 mailed
Dec. 14, 2023(5 pages).
                  (Continued)

*Primary Examiner* — Jennifer Doan
(74) *Attorney, Agent, or Firm* — Osha Bergman Watanabe
& Burton LLP

(57)    ABSTRACT

An optical computing device includes: an optical modula-
tion element including cells with independently configurable
amounts of modulation; and a reflector. The optical modu-
lation element is configured with N (N is a natural number
not less than 2)-computing regions A1, A2, . . . , AN. The
computing region A1 performs optical computing by modu-
lating and reflecting incident light. Each computing region
Ai (i is a corresponding natural number not less than 2 and
not more than N) other than the computing region A1
performs the optical computing by modulating and reflecting
signal light that has been modulated and reflected by a
computing region Ai−1 and then reflected by the reflector.

22 Claims, 15 Drawing Sheets

(56)                References Cited

U.S. PATENT DOCUMENTS

| | | | | |
|---|---|---|---|---|
| 7,847,225 | B2 | 12/2010 | Yokoyama | |
| 9,335,570 | B2 * | 5/2016 | Katou | G02F 1/035 |
| 9,852,372 | B1 * | 12/2017 | Nakano | H01S 5/12 |
| 2002/0105725 | A1 | 8/2002 | Sweatt et al. | |
| 2005/0149598 | A1 * | 7/2005 | Mendlovic | H04N 19/60 |
| | | | | 708/816 |
| 2008/0019632 | A1 * | 1/2008 | Ishii | G02F 1/225 |
| | | | | 385/2 |
| 2010/0085496 | A1 | 4/2010 | New et al. | |

FOREIGN PATENT DOCUMENTS

| | | | |
|---|---|---|---|
| JP | H04-328726 | A | 11/1992 |
| JP | H04-354076 | A | 12/1992 |
| JP | H06-130444 | A | 5/1994 |
| JP | H06-294984 | A | 10/1994 |
| JP | 2000-314858 | A | 11/2000 |
| JP | 2002-269532 | A | 9/2002 |
| JP | 2003-500698 | A | 1/2003 |
| JP | 4791945 | B2 | 10/2011 |
| JP | 2021060283 | A | 4/2021 |
| WO | 2021/101552 | A1 | 5/2021 |

OTHER PUBLICATIONS

International Search Report issued in corresponding International Application No. PCT/JP2021/022686, mailed on Sep. 14, 2021 (4 pages).
Written Opinion issued in corresponding International Application No. PCT/JP2021/022686, mailed on Sep. 14, 2021 (4 pages).

* cited by examiner

FIG. 1A
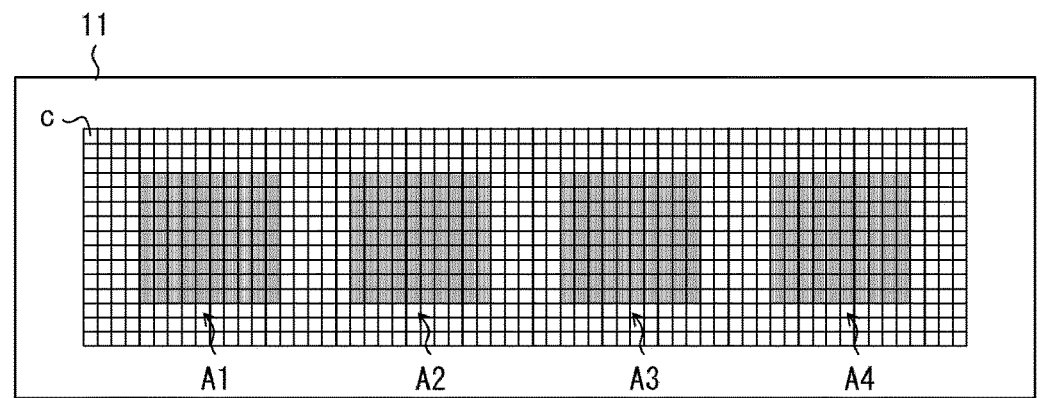
FIG. 1B
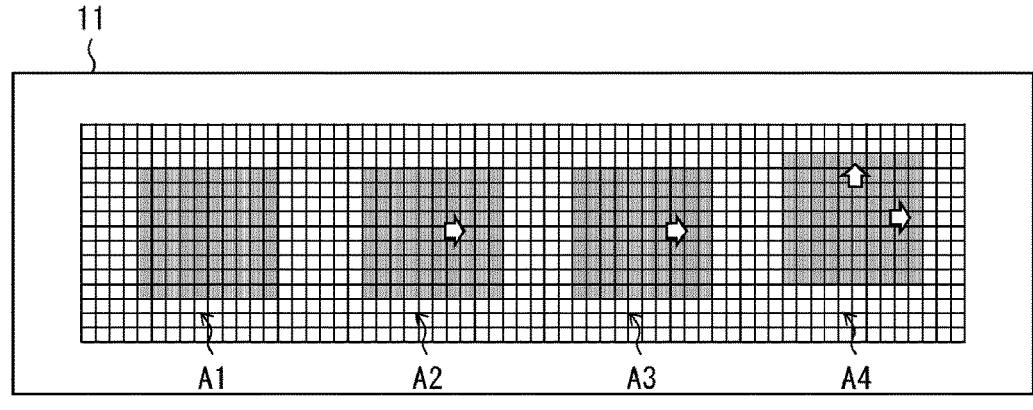
FIG. 1C

FIG. 14A
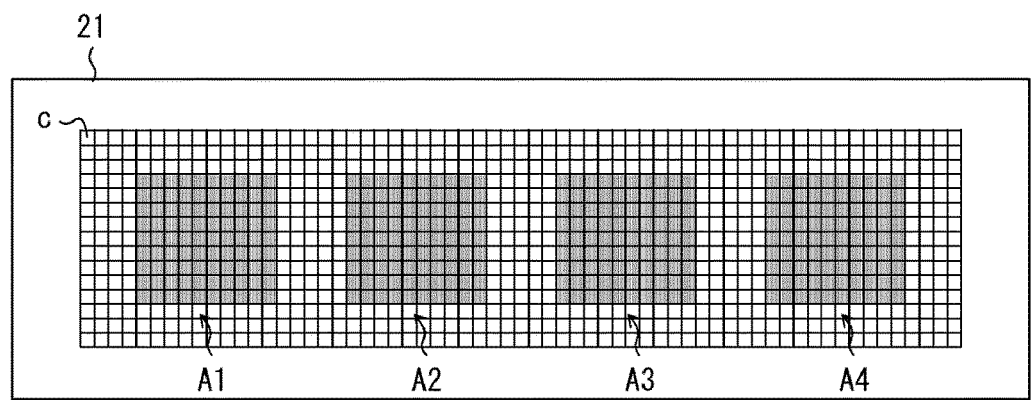
FIG. 14B
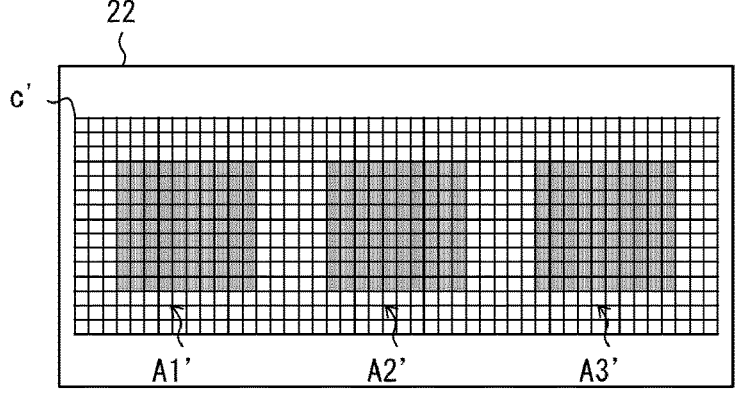
FIG. 14C

2B

24a

LIGHT RECEIVING SECTION (FOR DETECTION OF INTERMEDIATE RESULT AND FINAL RESULT)

26c

26b

26a

L0

26

22

A1'

A2'

L1

L1'

L0

L2

L2'

L1'

L1'

L2

L3

L2

L3 L2'

L3

L2'

27

A3

A2

A1

21

FIG. 18
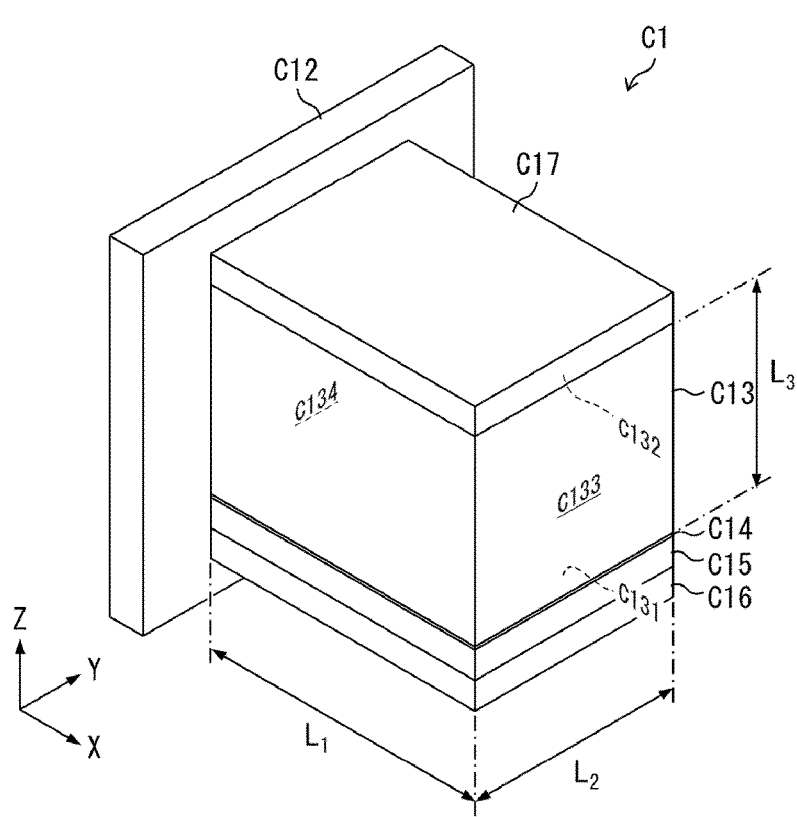
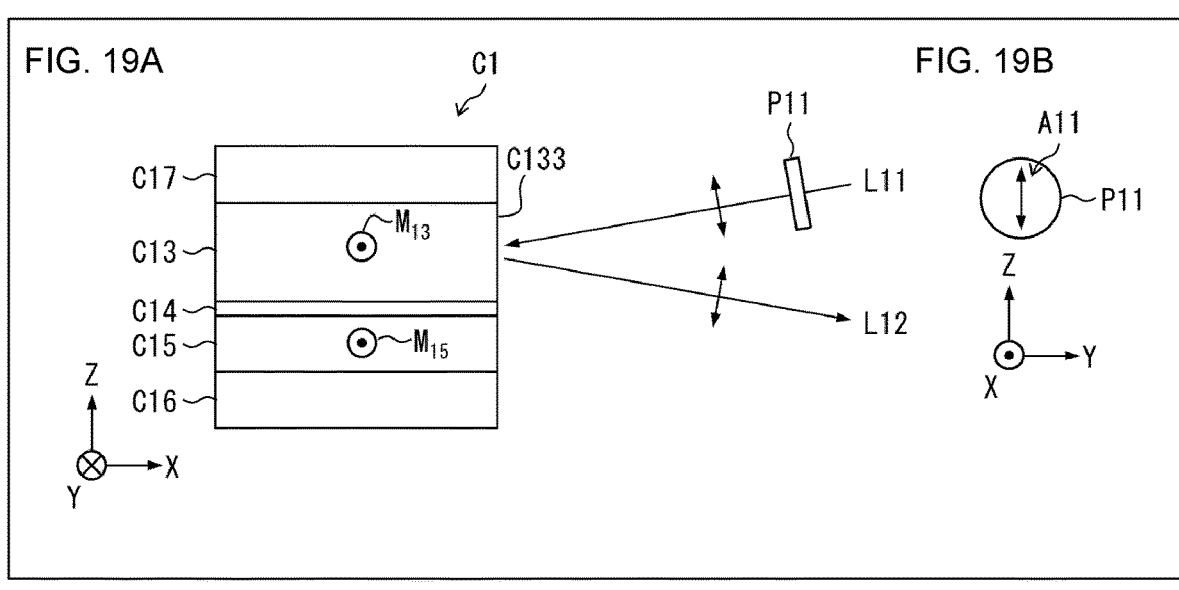

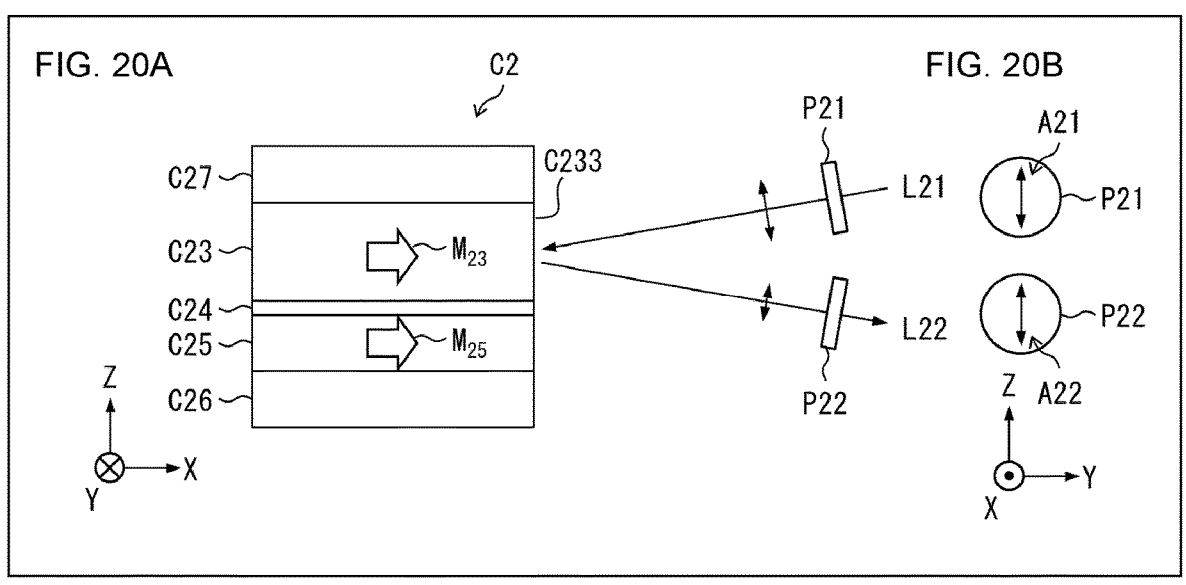
FIG. 20A     FIG. 20B
FIG. 21
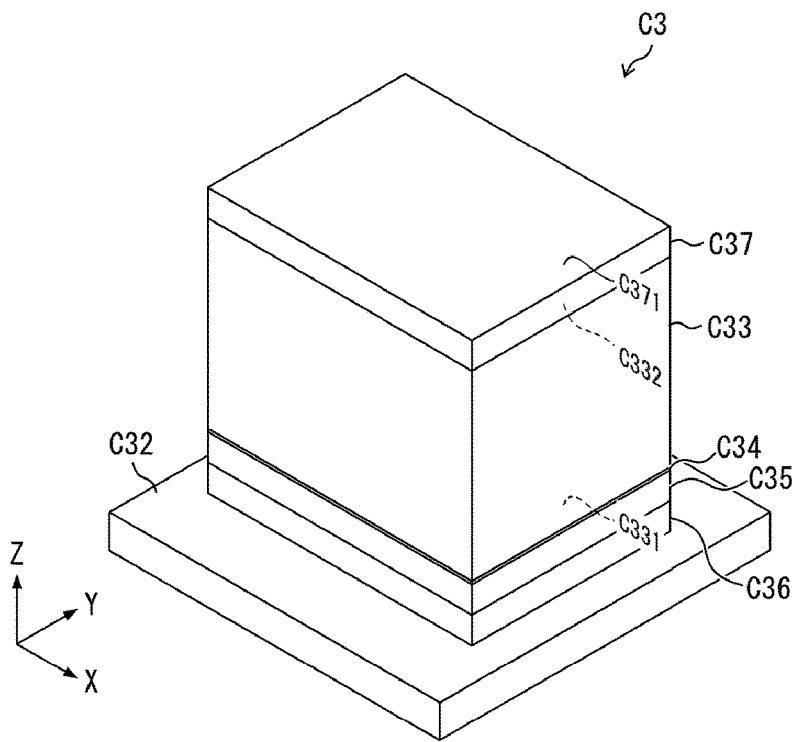

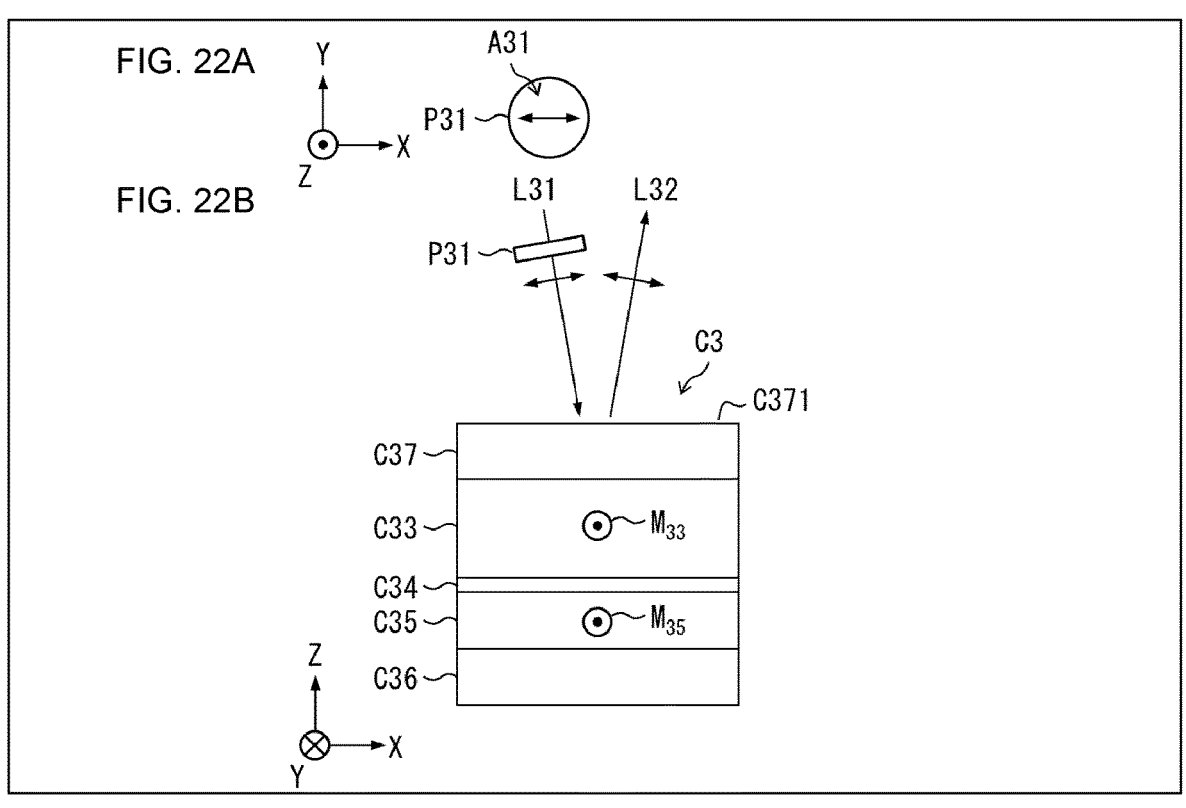
FIG. 22A
FIG. 22B
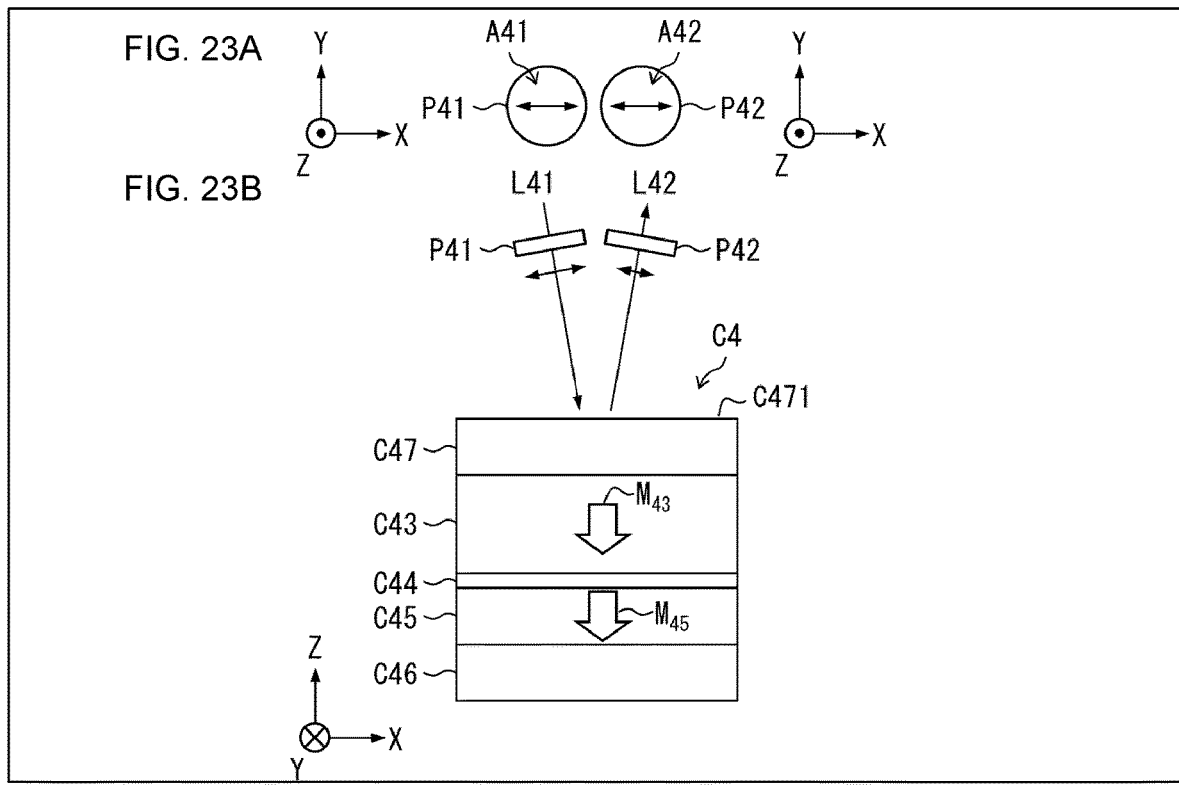
FIG. 23A
FIG. 23B

OPTICAL COMPUTING DEVICE AND OPTICAL COMPUTING METHOD

TECHNICAL FIELD

The present invention relates to an optical computing device and an optical computing method each for carrying out multiple-stage optical computing.

BACKGROUND

An optical element is known which has a plurality of cells and is designed to optically carry out predetermined computing by causing signal light transmitted through the respective cells to interfere with each other. Optical computing performed by using such an optical element has an advantage of achieving higher speed and lower electric power consumption as compared with electrical computing performed by using a processor. Multiple-stage optical computing (at least two stage-optical computing) can be achieved by causing two or more optical elements arranged side by side to sequentially act on signal light.

Patent Literature 1 discloses an optical neural network having an input layer, an intermediate layer, and an output layer. The optical element (described earlier) can be used as, for example, an intermediate layer of such an optical neural network.

CITATION LIST

Patent Literature

[Patent Literature 1]
Specification of U.S. Pat. No. 7,847,225

A conventional optical computing device that carries out multiple-stage optical computing includes a plurality of optical modulation elements (corresponding to the optical element (described earlier)) each having a single computing region. Thus, alignment adjustment between computing regions necessary for achievement of desired multiple-stage optical computing requires physical positioning of the optical modulation elements. This unfortunately makes it difficult to carry out the alignment adjustment between the computing regions with high accuracy.

SUMMARY

Embodiments of the present invention provide an optical computing device and an optical computing method each of which makes it easy to carry out alignment adjustment between computing regions with high accuracy.

An optical computing device in accordance with one or more embodiments of the present invention includes: an optical modulation element including a plurality of cells in which modulation amounts are independently configurable; and a reflector, N (N is a natural number not less than 2) computing regions A1, A2, . . . , AN being configured for the optical modulation element, the computing region A1 carrying out optical computing by modulating and reflecting incident light, and each computing region Ai (i is a corresponding natural number not less than 2 and not more than N) other than the computing region A1 carrying out the optical computing by modulating and reflecting signal light that has been modulated and reflected by a computing region Ai−1 and then reflected by the reflector.

An optical computing method in accordance with one or more embodiments of the present invention is an optical computing method carried out by using an optical modulation element (i) that includes a plurality of cells in which modulation amounts are independently configurable and (ii) for which N (N is a natural number not less than 2) computing regions A1, A2, . . . , AN are configured, the optical computing method including: using the computing region A1 to carry out optical computing by modulating and reflecting incident light; and using each computing region Ai (i is a corresponding natural number not less than 2 and not more than N) other than the computing region A1 to carry out the optical computing by modulating and reflecting signal light that has been modulated and reflected by a computing region Ai−1 and then reflected by a reflector.

According to one or more embodiments of the present invention, alignment adjustment between computing regions necessary for achievement of desired multiple-stage optical computing does not require physical positioning of an optical modulation element. Thus, one or more embodiments of the present invention makes it easy to carry out the alignment adjustment between the computing regions with high accuracy.

BRIEF DESCRIPTION OF DRAWINGS

FIG. 1A is a cross-sectional view illustrating a configuration of an optical computing device in accordance with one or more embodiments. FIGS. 1B and 1C are plan views of an optical modulation element of the optical computing device illustrated in FIG. 1A.

FIG. 14A is a cross-sectional view illustrating a configuration of an optical computing device in accordance with one or more embodiments. FIGS. 14B and 14C are plan views of an optical modulation element of the optical computing device illustrated in FIG. 14A.

FIG. 18 is a perspective view of Specific Example 1 of a cell.

FIG. 19A is a cross-sectional view of Specific Example 1 of the cell according to one or more embodiments. FIG. 19B is a plan view of a polarizing plate.

FIG. 20A is a perspective view of Specific Example 2 of the cell according to one or more embodiments. FIG. 20B is a plan view of a polarizing plate.

FIG. 21 is a perspective view of Specific Example 3 of the cell according to one or more embodiments.

FIG. 22A is a plan view of a polarizing plate. FIG. 22B is a cross-sectional view of Specific Example 3 of the cell.

FIG. 23 is a cross-sectional view of Specific Example 4 of the cell according to one or more embodiments.

Figure 2:
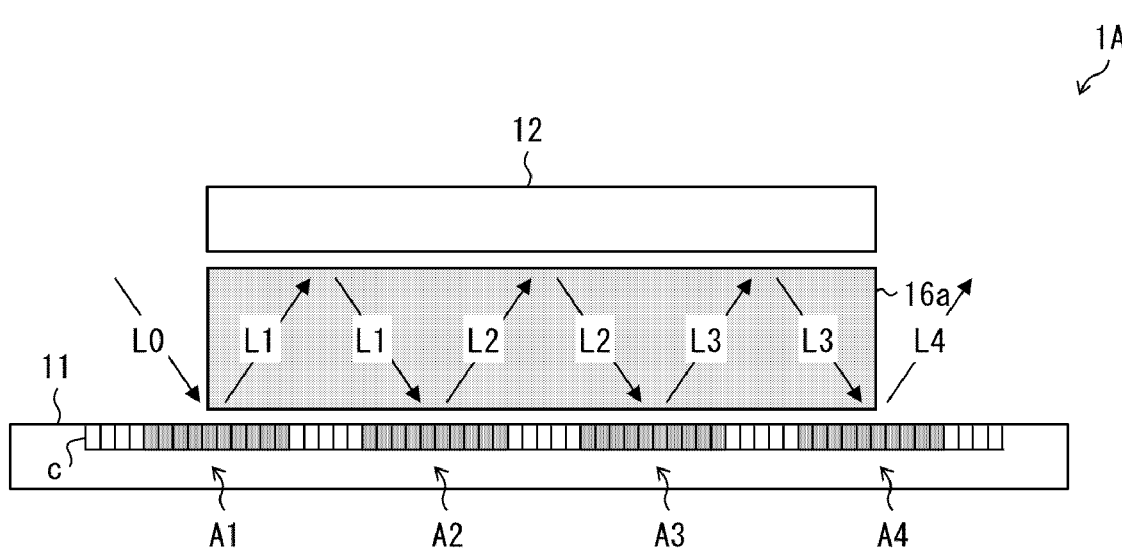
FIG. 2 is a cross-sectional view illustrating Variation 1 of the optical computing device illustrated in FIG. 1.

DETAILED DESCRIPTION (Configuration of Optical Computing Device)

The following description will discuss an optical computing device 1 in accordance with one or more embodiments of the present invention with reference to FIGS. 1A-1C. FIG. 1A is a cross-sectional view of the optical computing device 1, and FIGS. 1B and 1C are plan views of an optical modulation element 11 of the optical computing device 1.

As illustrated in FIGS. 1A-1C, the optical computing device 1 includes the optical modulation element 11 and a mirror 12 (an example of a "reflector" in Claims). The optical modulation element 11 and the mirror 12 are provided so that one (a main surface on the upper side of the drawing in FIGS. 1A-1C) of main surfaces of the optical modulation element 11 and one (a main surface on the lower side of the drawing in FIGS. 1A-1C) of main surfaces of the mirror 12 face each other in parallel with each other.

The optical modulation element 11 includes a plurality of cells C in which modulation amounts are independently configurable. A cell C is a reflective modulator that has a phase modulation function or an intensity modulation function. One or more embodiments uses, as the optical modulation element 11, a substrate including the plurality of cells C that are provided in a matrix pattern. The cell C is a microcell that has a size on the order of micrometers or smaller, i.e., a size of less than 10 μm. The size of the cell C has a lower limit that is not particularly limited but is, for example, 1 nm. Specific examples of the cell C will be described later with reference to another drawing.

N computing regions A1, A2, . . . , AN are configured for the optical modulation element 11. Note here that N is a natural number not less than 2. Each computing region Aj (j is a corresponding natural number not less than 1 and not more than N) is a region on a main surface of the optical modulation element 1 and is constituted by the plurality of cells C that are provided in a matrix pattern. In FIG. 1, the cells C constituting the each computing region Aj are hatched so as to be distinguished from the other cells C. The following description makes an assumption that N=4. Note, however, that this assumption does not limit the present invention.

A first computing region A1 carries out first optical computing by modulating and reflecting incident light L0. Note here that carrying out the first optical computing means that first signal light L1 in which a spatial intensity distribution indicates a result of the first optical computing is generated by causing light having been modulated and reflected by the respective cells C constituting the first computing region A1 to interfere with each other. Here, details of the first optical computing are determined in accordance with modulation amounts in the respective cells C constituting the first computing region A1. The first signal light L1 that has been generated by the first computing region A1 is reflected by the mirror 12 and then enters a second computing region A2.

The second computing region A2 carries out second optical computing by modulating and reflecting the first signal light L1. Note here that carrying out the second optical computing means that second signal light L2 indicative of a result of the second optical computing is generated by causing light having been modulated and reflected by the respective cells C constituting the second computing region A2 to interfere with each other. Here, details of the second optical computing are determined in accordance with modulation amounts in the respective cells C constituting the second computing region A2. The second signal light L2 that has been generated by the second computing region A2 is reflected by the mirror 12 and then enters a third computing region A3.

The third computing region A3 carries out third optical computing by modulating and reflecting the second signal light L2. Note here that carrying out the third optical computing means that third signal light L3 indicative of a result of the third optical computing is generated by causing light having been modulated and reflected by the respective cells C constituting the third computing region A3 to interfere with each other. Here, details of the third optical computing are determined in accordance with modulation amounts in the respective cells C constituting the third computing region A3. The third signal light L3 that has been generated by the third computing region A3 is reflected by the mirror 12 and then enters a fourth computing region A4.

The fourth computing region A4 carries out fourth optical computing by modulating and reflecting the third signal light L3. Note here that carrying out the fourth optical computing means that fourth signal light L4 indicative of a result of the fourth optical computing is generated by causing light having been modulated and reflected by the respective cells C constituting the fourth computing region A4 to interfere with each other. Here, details of the fourth optical computing are determined in accordance with modulation amounts in the respective cells C constituting the fourth computing region A4. The fourth signal light L4 that has been generated by the fourth computing region A4 enters, for example, a light receiving section 14 (described later).

The number of cells C constituting the optical modulation element 11 is larger than the sum of the number of cells C constituting the each computing region Aj, and it can be freely set during manufacture or use of the optical computing device 1 which cell C is to be caused to function as the each computing region Aj. In other words, the each computing region Aj can be positioned during manufacture or use of the optical computing device 1. (b) of FIG. 1 is an example of the optical modulation element 11 prior to positioning of the each computing region Aj, and (c) of FIG.

1 is an example of the optical modulation element 11 after positioning of the each computing region Aj. Here, the second computing region A2 and the third computing region A3 each have been moved rightward by one cell in the drawing. Furthermore, the fourth computing region A4 has been moved rightward by one cell in the drawing and upward by one cell in the drawing. Such positioning of the each computing region Aj can be used for alignment adjustment between computing regions.

A conventional optical computing device includes a plurality of optical modulation elements (of a transmission type) each having a single computing region. Thus, alignment adjustment between computing regions necessary for achievement of desired multiple-stage optical computing requires physical positioning of the optical modulation elements. This makes it relatively difficult to carry out the alignment adjustment between the computing regions with high accuracy, so that it is difficult to achieve desired multiple-stage optical computing.

In contrast, the optical computing device 1 in accordance with one or more embodiments includes a single optical modulation element 11 (of a reflection type) having a plurality of computing regions A1, A2, . . . , AN. Thus, alignment adjustment between computing regions necessary for achievement of desired multiple-stage optical computing does not require physical positioning of the optical modulation element 11. This makes it relatively easy to carry out the alignment adjustment between the computing regions with high accuracy, so that it is relatively easy to achieve desired multiple-stage optical computing.

Note that the incident light L0 can be signal light that has been subjected to spatial intensity modulation by an input signal, or can be carrier light that has not been subjected to the spatial intensity modulation by any input signal. In the former case, a spatial intensity distribution of an output signal obtained by demodulating Nth signal light LN indicates a result obtained by sequentially applying, to the input signal, the first optical computing, the second optical computing, . . . , Nth optical computing. In the latter case, the signal light L1 that has been subjected to the spatial intensity modulation by the input signal is generated in the first computing region A1. In this case, the spatial intensity distribution of the output signal obtained by demodulating the Nth signal light LN indicates a result obtained by sequentially applying, to the input signal, the second optical computing, the third optical computing, . . . , the Nth optical computing.

The optical computing device 1 can further include a light emitting section 13 as indicated by a dotted line in FIG. 1. The light emitting section 13 is configured to generate the incident light L0 (described earlier) (e.g., to convert an electrical signal indicative of an input signal into the incident light L0). The light emitting section 13 can be, for example, a two-dimensional display including a plurality of light emitting cells that are provided in a matrix pattern.

The optical computing device 1 can further include a light receiving section 14 as indicated by a dotted line in FIG. 1. The light receiving section 14 is configured to detect the Nth signal light LN (e.g., to convert the Nth signal light LN into an electrical signal indicative of an output signal). The light receiving section 14 can be, for example, a two-dimensional image sensor including a plurality of light receiving cells that are provided in a matrix pattern.

The optical computing device 1 can further include a control section 15 as indicated by a dotted line in FIG. 1. The control section 15 is configured to control, in accordance with the Nth signal light LN, a modulation amount of a cell C included in the optical modulation element 11. The control section 15 can be constituted by, for example, an integrated circuit (IC) that operates in accordance with an electrical signal obtained in the light receiving section 14. Examples of the control, details of which are not particularly limited, include control for adjusting alignment between computing regions so as to obtain the Nth signal light LN indicative of a desired output signal. In a case where the optical computing device 1 is used as a learned model, this control can also be used for learning for building that learned model.

(Variation 1 of Optical Computing Device)

The following description will discuss Variation 1 of the optical computing device 1 (hereinafter referred to as an "optical computing device 1A") with reference to FIG. 2. FIG. 2 is a cross-sectional view of the optical computing device 1A.

A point in which the optical computing device 1A differs from the optical computing device 1 is that a medium 16a provided between the optical modulation element 11 and the mirror 12 is added. Note here that the medium 16a is a medium that has a higher refractive index than air or has a lower refractive index than air. A configuration in which the medium 16a has a higher refractive index than air is hereinafter referred to as a "configuration α1". Furthermore, a configuration in which the medium 16a has a lower refractive index than air is referred to as a "configuration α2".

In a case where the configuration α1 is employed, it is possible to increase an optical distance between the optical modulation element 11 and the mirror 12 without changing a physical distance between the optical modulation element 11 and the mirror 12 optical distance. In contrast, in a case where the configuration α2 is employed, it is possible to reduce the optical distance between the optical modulation element 11 and the mirror 12 without changing the physical distance between the optical modulation element 11 and the mirror 12 optical distance. That is, appropriate setting of the refractive index of the medium 16a makes it possible to adjust an optical interval between computing regions without changing the physical distance between the optical modulation element 11 and the mirror 12.

Note that, in a case where the configuration α1 is employed, it is possible to reduce the physical distance between the optical modulation element 11 and the mirror 12 without changing the optical distance between the optical modulation element 11 and the mirror 12. This allows the optical computing device 1A to be thinner.

(Variation 2 of Optical Computing Device)

Figure 3:
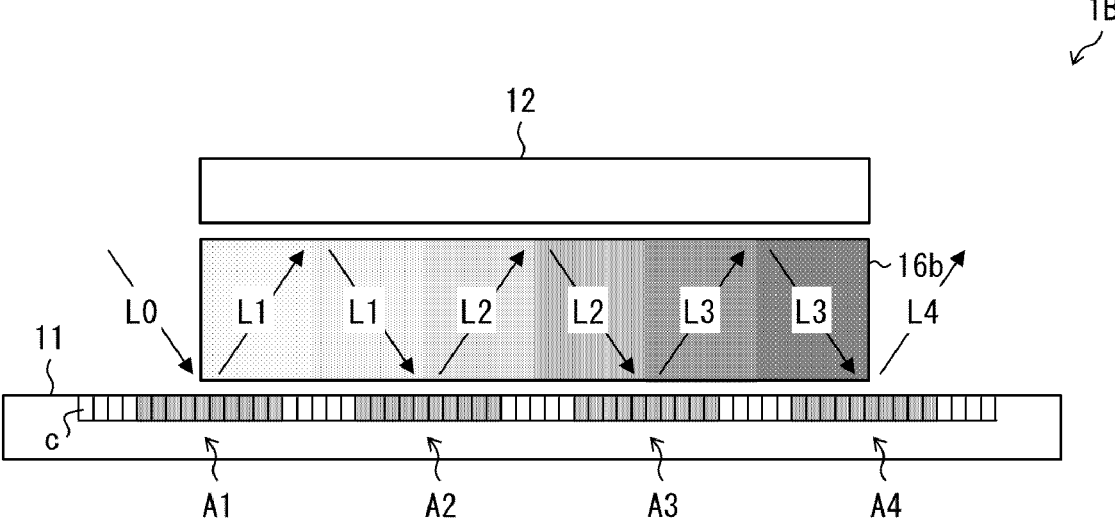
FIG. 3 is a cross-sectional view illustrating Variation 2 of the optical computing device illustrated in FIG. 1.

The following description will discuss Variation 2 of the optical computing device 1 (hereinafter referred to as an "optical computing device 1B") with reference to FIG. 3. FIG. 3 is a cross-sectional view of the optical computing device 1B.

A point in which the optical computing device 1B differs from the optical computing device 1 is that a medium 16b provided between the optical modulation element 11 and the mirror 12 is added. The medium 16b is a medium that has a higher or lower refractive index in a region through which ith signal light L1 (i is a corresponding natural number not less than 2 and not more than N) passes than in a region through which i−1th signal light L1−1 passes. Note here that the ith signal light L1 is signal light having been modulated and reflected by an ith computing region Ai and that the i−1th signal light L1−1 is signal light having been modulated and reflected by an i−1th computing region Ai−1. A configuration in which the refractive index is higher in the region through which the ith signal light L1 passes than in the region through which the i−1th signal light L1−1 passes is hereinafter referred to as a "configuration β1". Furthermore, a configuration in which the refractive index is lower in the region through which the ith signal light L1 passes than in the region through which the i−1th signal light L1−1 passes is referred to as a "configuration β2".

In a case where the configuration β1 is employed, an optical distance from the ith computing region Ai to an i+1th computing region Ai+1 can be made greater than an optical distance from the i−1th computing region Ai−1 to the ith computing region Ai. In contrast, in a case where the configuration 132 is employed, the optical distance from the ith computing region Ai to the i+1th computing region Ai+1 can be made smaller than the optical distance from the i−1th computing region Ai−1 to the ith computing region Ai. That is, appropriate setting of a change in refractive index of the medium 16b makes it possible to adjust a change in optical distance between computing regions.

(Variation 3 of Optical Computing Device)

Figure 4:
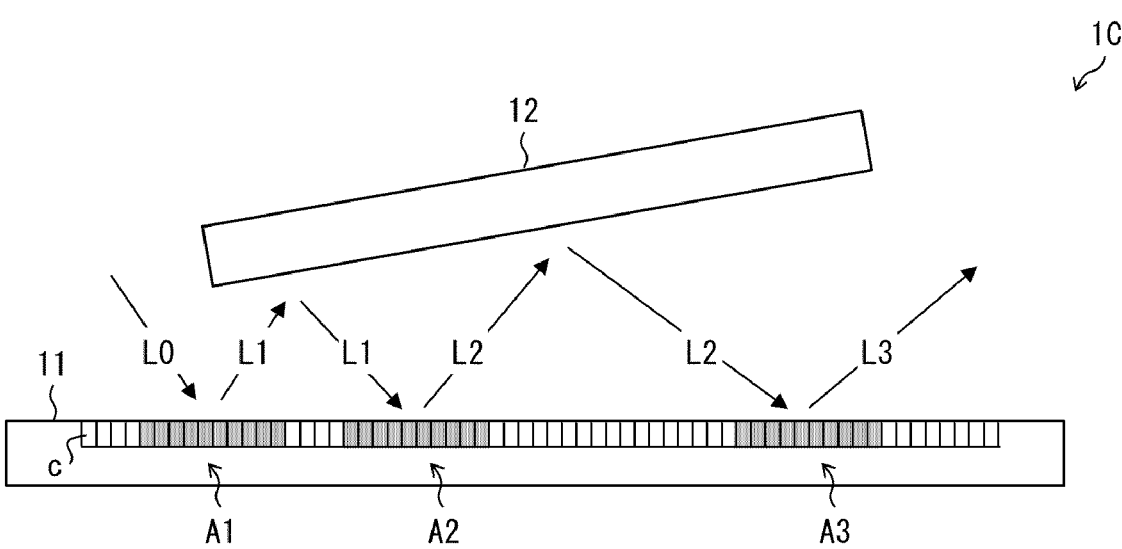
FIG. 4 is a cross-sectional view illustrating Variation 3 of the optical computing device illustrated in FIG. 1.

The following description will discuss Variation 3 of the optical computing device 1 (hereinafter referred to as an "optical computing device 1C") with reference to FIG. 4. FIG. 4 is a cross-sectional view of the optical computing device 1C.

A point in which the optical computing device 1C differs from the optical computing device 1 is that the mirror 12 is obliquely provided. This causes a physical distance from the mirror 12 to the optical modulation element 11 to be greater or smaller in the region through which the ith signal light L1 (i is a corresponding natural number not less than 2 and not more than N) passes than in the region through which the i−1th signal light L1−1 passes. Note here that the ith signal light L1 is signal light having been modulated and reflected by the ith computing region Ai and that the i−1th signal light L1−1 is signal light having been modulated and reflected by the i−1th computing region Ai−1. A configuration in which the physical distance from the mirror 12 to the optical modulation element 11 is greater in the region through which the ith signal light L1 passes than in the region through which the i−1th signal light Li−1 passes is hereinafter referred to as a "configuration γ1". Furthermore, a configuration in which the physical distance from the mirror 12 to the optical modulation element 11 is smaller in the region through which the ith signal light L1 passes than in the region through which the i−1th signal light Li−1 passes is hereinafter referred to as a "configuration γ2".

In a case where the configuration γ1 is employed, the optical distance from the ith computing region Ai to the i+1th computing region Ai+1 can be made greater than the optical distance from the i−1th computing region Ai−1 to the ith computing region Ai. In contrast, in a case where the configuration γ2 is employed, the optical distance from the ith computing region Ai to the i+1th computing region Ai+1 can be made smaller than the optical distance from the i−1th computing region Ai−1 to the ith computing region Ai. That is, appropriate setting of an inclination of the mirror 12 makes it possible to adjust a change in optical distance between computing regions.

It should be noted that in Variation 3, a position of the ith computing region Ai in the optical modulation element 11 is adjusted to a position at which the i−1th signal light L1−1 having been reflected by the mirror 12 enters the ith computing region Ai. Such alignment adjustment can be carried out because the optical modulation element 11 includes the plurality of cells C in which modulation amounts are independently configurable.

(Variation 4 of Optical Computing Device)

Figure 5:
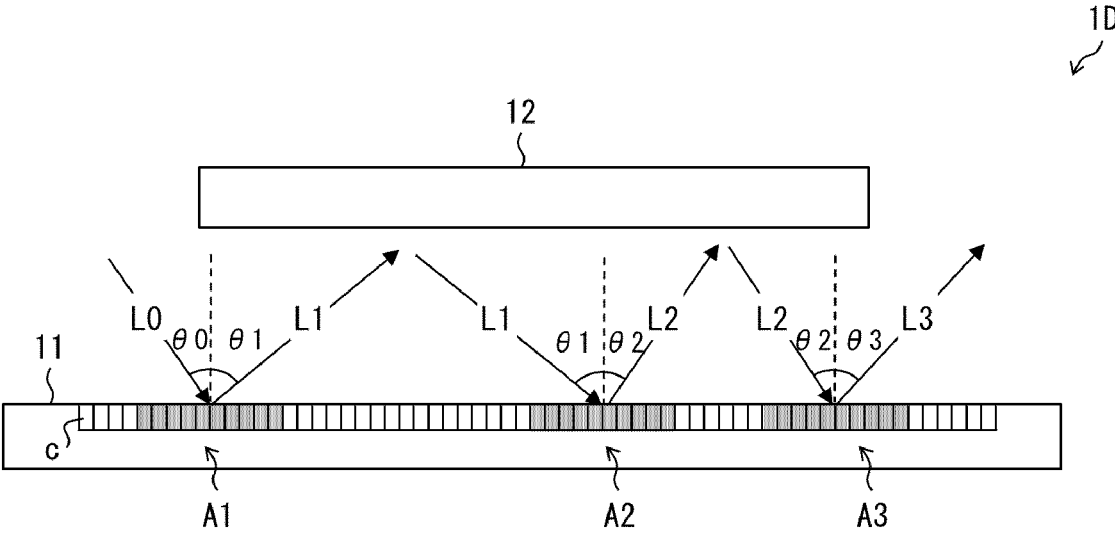
FIG. 5 is a cross-sectional view illustrating Variation 4 of the optical computing device illustrated in FIG. 1.

The following description will discuss Variation 4 of the optical computing device 1 (hereinafter referred to as an "optical computing device 1D") with reference to FIG. 5. FIG. 5 is a cross-sectional view of the optical computing device 1D.

A point in which the optical computing device 1D differs from the optical computing device 1 is that at least one computing region An (n is any natural number not less than 1 and not more than N) is configured to reflect n−1th signal light Ln−1 (in a case where n=1, the incident light L0), which has entered the at least one computing region An at an incidence angle θn−1 with respect to a normal line to a surface of the optical modulation element 11, at a reflection angle θn with respect to the normal line, the reflection angle θn being different from the incidence angle θn−1.

In the example illustrated in FIG. 5, the first computing region A1 is configured to reflect the incident light L0, which has entered the first computing region A1 at the incidence angle θ0, at a reflection angle θ1 greater than the incidence angle θ0. Furthermore, the second computing region A2 is configured to reflect the first signal light L1, which has entered the second computing region A2 at the incidence angle θ1, at a reflection angle θ2 smaller than the incidence angle θ1. Moreover, the third computing region A3 is configured to reflect the second signal light L2, which has entered the third computing region A3 at an incidence angle θ2, at a reflection angle θ3 greater than the incidence angle θ2.

In a case where the nth computing region An reflects nth signal light Ln−1 (in a case where n=1, the incident light L0), which has entered the nth computing region An at the incidence angle θn−1, at the reflection angle θn greater than the incidence angle θn−1, an optical distance from the nth computing region An to an n+1th computing region An+1 can be made relatively great. In contrast, in a case where the nth computing region An reflects the nth signal light Ln−1 (in a case where n=1, the incident light L0), which has entered the nth computing region at the incidence angle θn−1, at the reflection angle θn smaller than the incidence angle θn−1, the optical distance from the nth computing region An to the n+1th computing region An+1 can be made relatively small. That is, appropriate setting of the reflection angle θn in the nth computing region An makes it possible to freely adjust the optical distance from the nth computing region An to the n+1th computing region An+1.

Variation 4 describes a configuration in which the nth computing region An reflects the n−1th signal light Ln−1 so that the incidence angle θn−1 and the reflection angle θn differ from each other. However, a configuration of the nth computing region An is not limited to this. That is, the nth computing region An can be configured to reflect the n−1th signal light Ln−1 so that an incidence plane and a reflection plane differ from each other. Note here that the incidence plane refers to a plane containing (i) the normal line to the surface of the optical modulation element 11 and (ii) an incidence optical axis (optical axis of the n−1th signal light Ln−1). Note also that the reflection plane refers to a plane containing (i) the normal line to the surface of the optical modulation element 11 and (ii) an incidence optical axis (optical axis of the nth signal light Ln).

It should be noted that in Variation 4, a position of the ith computing region Ai (i is a corresponding natural number not less than 2 and not more than N) in the optical modulation element 11 is adjusted to a position at which the i−1th signal light L1−1 having been reflected by the mirror 12 enters the ith computing region Ai. Such alignment adjustment can be carried out because the optical modulation element 11 includes the plurality of cells C in which modulation amounts are independently configurable.

(Variation 5 of Optical Computing Device)

Figure 6:
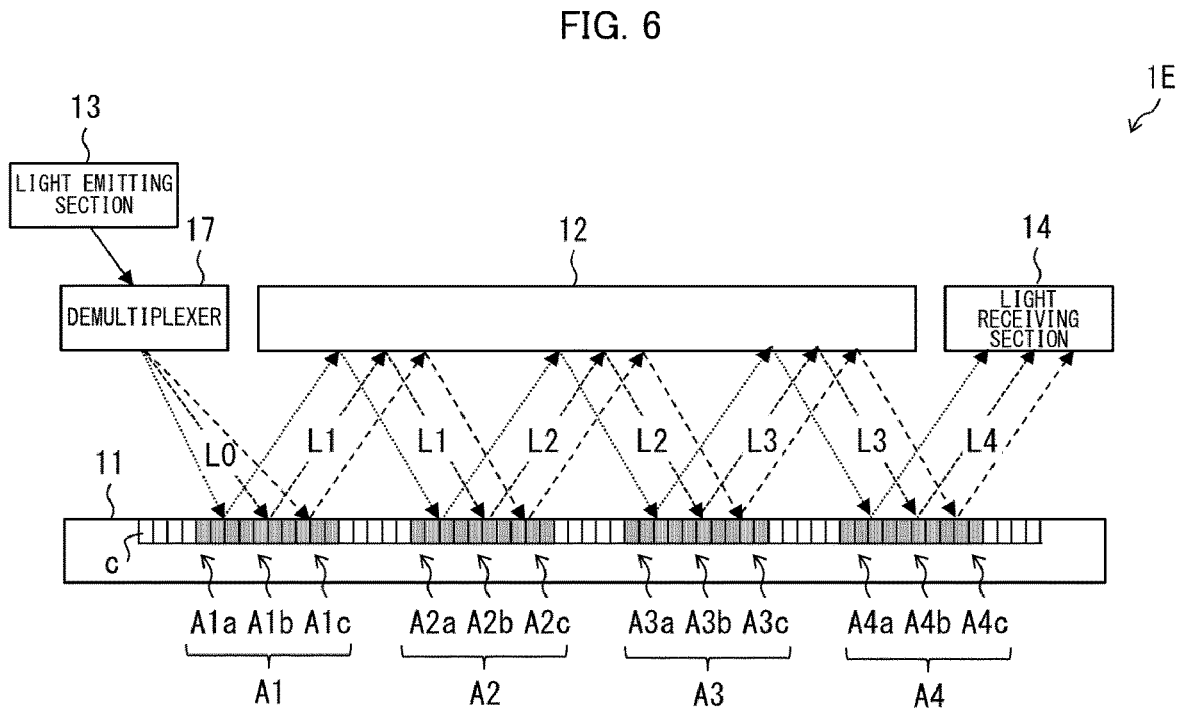
FIG. 6 is a cross-sectional view illustrating Variation 5 of the optical computing device illustrated in FIG. 1.

The following description will discuss Variation 5 of the optical computing device 1 (hereinafter referred to as an "optical computing device 1E") with reference to FIG. 6. FIG. 6 is a cross-sectional view of the optical computing device 1E.

A first point in which the optical computing device 1E differs from the optical computing device 1 is that a demultiplexer 17 configured to demultiplex the incident light L0 in accordance with a wavelength is added. A second point in which the optical computing device 1E differs from the optical computing device 1 is that the each computing region Aj (j is a corresponding natural number not less than 1 and not more than N) has been divided into small regions Aja, Ajb, and Ajc that modulate and reflect signal light having different wavelengths. Note that the demultiplexer 17 can be, for example, a prism.

Note here that the small region Aja is a region for carrying out ith optical computing with respect to a short-wavelength component among wavelength components contained in j–1th signal light Aj–1 (in a case where j=1, the incident light L0). Furthermore, the small region Ajb is a region for carrying out the ith optical computing with respect to a medium-wavelength component among the wavelength components contained in the j–1th signal light Aj–1 (in a case where j=1, the incident light L0). Moreover, the small region Ajc is a region for carrying out the ith optical computing with respect to a long-wavelength component among the wavelength components contained in the j–1th signal light Aj–1 (in a case where j=1, the incident light L0). The three small regions Aja, Ajb, and Ajc included in the each computing region Aj can be designed to carry out optical computing identically to each other, or can be designed to carry out optical computing differently from each other. Further, three components (the short-wavelength component, the medium-wavelength component, and the long-wavelength component) contained in the incident light L0 can be modulated by input signals that are identical to each other, or can be modulated by input signals that are different from each other.

The wavelength components of the Nth signal light LN having been modulated and reflected by an Nth computing region AN enters the light receiving section 14 independently of each other. Thus, according to the optical computing device 1E, the optical computing can be simultaneously carried out in a short-wavelength range, a medium-wavelength range, and a long-wavelength range, so that results of the optical computing carried out in those wavelength ranges can be obtained independently of each other.

(Variation 6 of Optical Computing Device)

Figure 7:
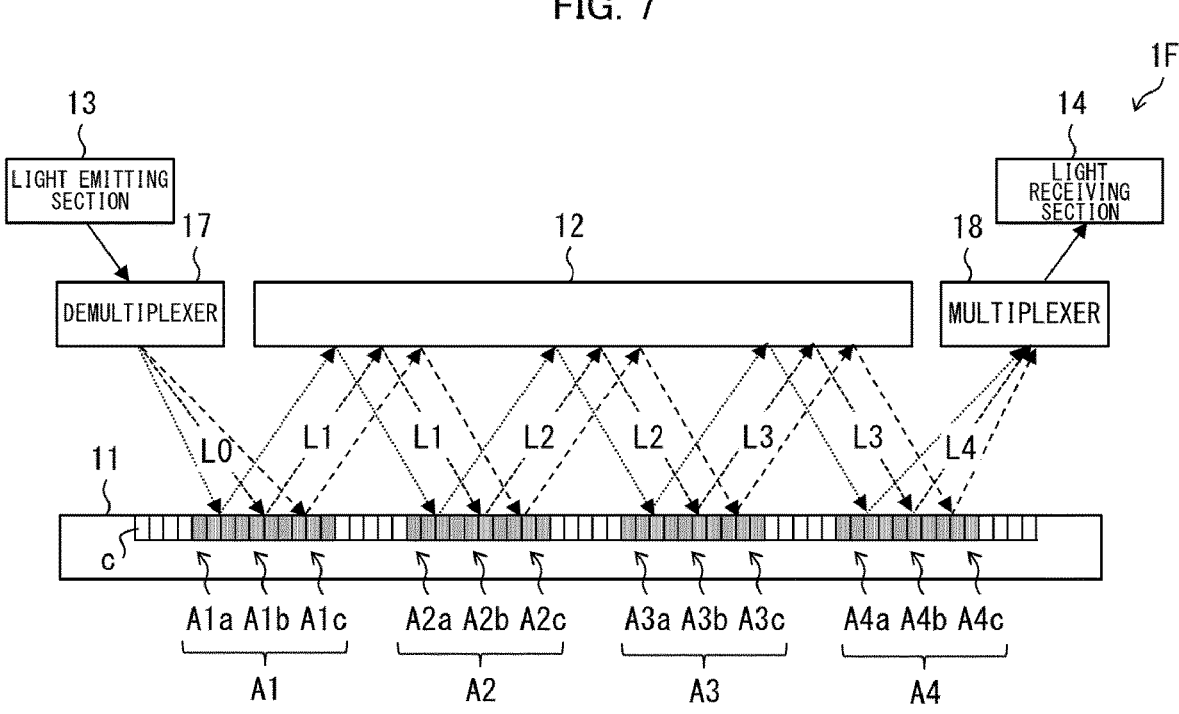
FIG. 7 is a cross-sectional view illustrating Variation 6 of the optical computing device illustrated in FIG. 1.

The following description will discuss Variation 6 of the optical computing device 1 (hereinafter referred to as an "optical computing device 1F") with reference to FIG. 7. FIG. 7 is a cross-sectional view of the optical computing device 1F.

A first point in which the optical computing device 1F differs from the optical computing device 1E is that a multiplexer 18 is added which is configured to multiplex the Nth signal light LN having different wavelengths and having been modulated and reflected by the respective small regions ANa, ANb, and ANc constituting the Nth computing region AN. A second point in which the optical computing device 1F differs from the optical computing device 1E is that the light receiving section 14 is configured to receive the Nth signal light LN that has been multiplexed by the multiplexer 18. Note that the multiplexer 18 can be, for example, a prism.

The Nth signal light N that has been multiplexed by the multiplexer 18 represents the sum of the results of the optical computing carried out in the short-wavelength range, the medium-wavelength range, and the long-wavelength range. Thus, according to the optical computing device 1E, the optical computing can be simultaneously carried out in the short-wavelength range, the medium-wavelength range, and the long-wavelength range, so that the sum of the results of the optical computing carried out in those wavelength ranges can be obtained.

(Variation 7 of Optical Computing Device)

Figure 8:
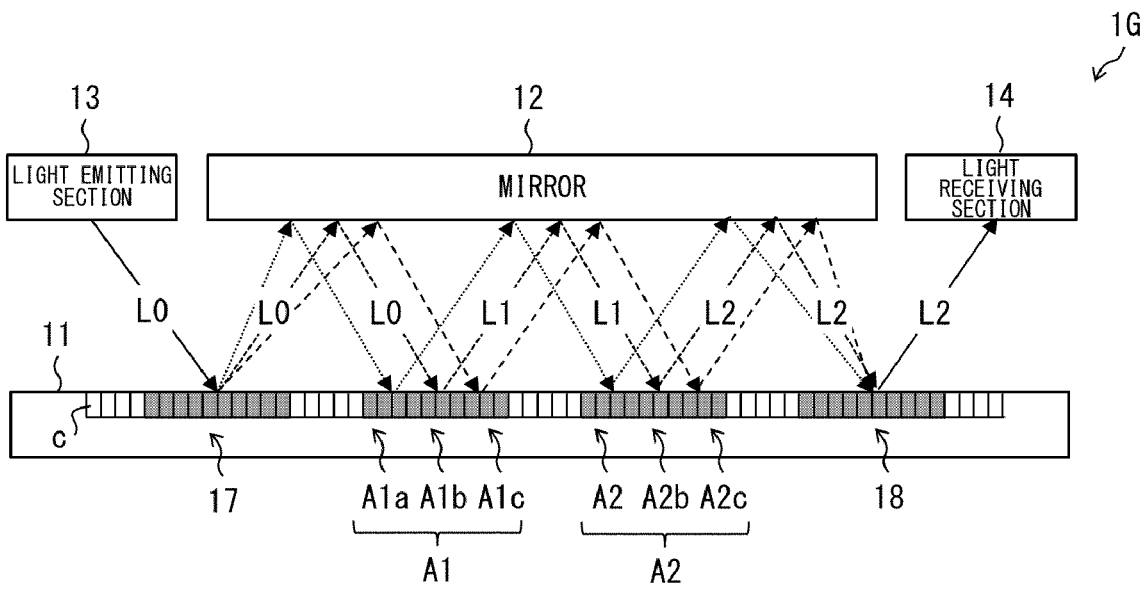
FIG. 8 is a cross-sectional view illustrating Variation 7 of the optical computing device illustrated in FIG. 1.

The following description will discuss Variation 7 of the optical computing device 1 (hereinafter referred to as an "optical computing device 1G") with reference to FIG. 8. FIG. 8 is a cross-sectional view of the optical computing device 1G. Note that Variation 7 assumes that N=2.

A first point in which the optical computing device 1G differs from the optical computing device 1F is that one region on the optical modulation element 11 is used as the demultiplexer 17 (described earlier) by being caused to function as a diffraction grating configured to demultiplex the incident light L0 in accordance with a wavelength. A second point in which the optical computing device 1G differs from the optical computing device 1F is that one region on the optical modulation element 11 is used as the multiplexer 18 (described earlier) by being caused to function as a diffraction grating configured to multiplex the Nth signal light LN having different wavelengths and having been modulated and reflected by the respective small regions ANa, ANb, and ANc constituting the Nth computing region AN. Thus, without adding any configuration such as a prism, it is possible to achieve the optical computing device 1G that has a function equivalent to the function of the optical computing device 1F.

In Variation 7, both the demultiplexer 17 and the multiplexer 18 are omitted, and the optical modulation element 11 is caused to carry out the functions of both the demultiplexer 17 and the multiplexer 18. Note, however, that a configuration of one or more embodiments of the present invention is not limited to such a configuration. That is, it is possible to omit only the demultiplexer 17 so as to cause the optical modulation element 11 to carry out the function of only the demultiplexer 17, or it is possible to omit only the multiplexer 18 so as to cause the optical modulation element 11 to carry out the function of only the multiplexer 18.

(Variation 8 of Optical Computing Device)

Figure 9:
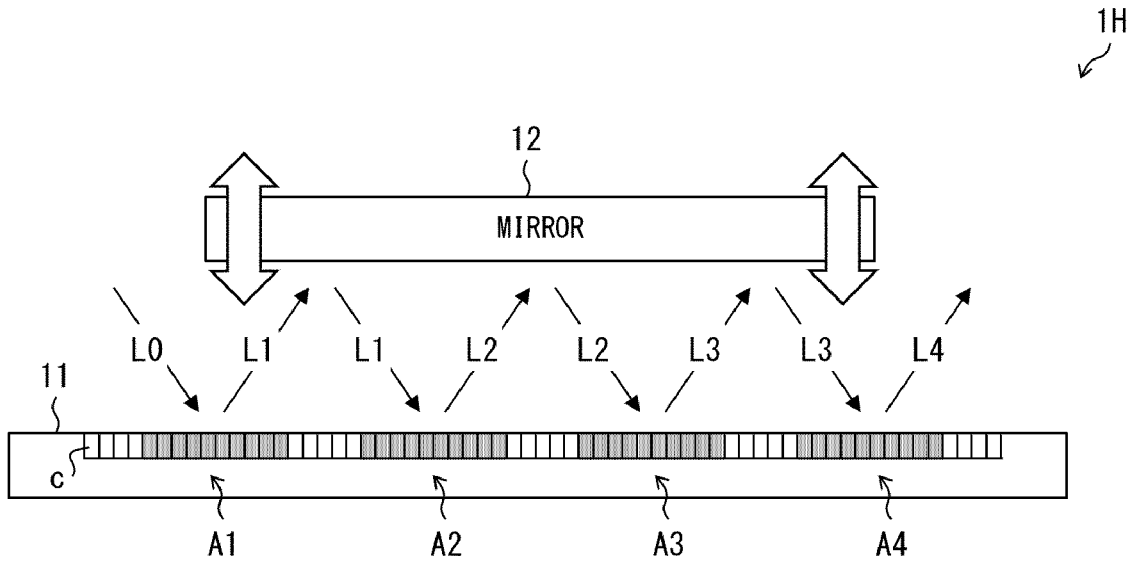
FIG. 9 is a cross-sectional view illustrating Variation 8 of the optical computing device illustrated in FIG. 1.

The following description will discuss Variation 8 of the optical computing device 1 (hereinafter referred to as an "optical computing device 1H") with reference to FIG. 9. FIG. 9 is a cross-sectional view of the optical computing device 1H.

A point in which the optical computing device 1H differs from the optical computing device 1 is that the mirror 12 can be raised and lowered, i.e., that a distance between the optical modulation element 11 and the mirror 12 is variable. Thus, appropriate setting of the distance between the optical modulation element 11 and the mirror 12 makes it possible to adjust an optical distance between computing regions.

Note that the optical computing device 1H may further has a function to adjust, in accordance with the raising and lowering of the mirror 12, an incidence angle at which the incident light L0 enters the first computing region A1. Alternatively, the optical computing device 1H may further has a function to adjust a position of the each computing region Ai (i is a corresponding natural number not less than 2 and not more than N) in accordance with the raising and lowering of the mirror 12. Thus, even in a case where the mirror 12 is raised and lowered, it is possible to achieve the optical computing device 1H in which the i−1th signal light Li−1 correctly enters the ith region Ai.

(Variation 9 of Optical Computing Device)

Figure 10:
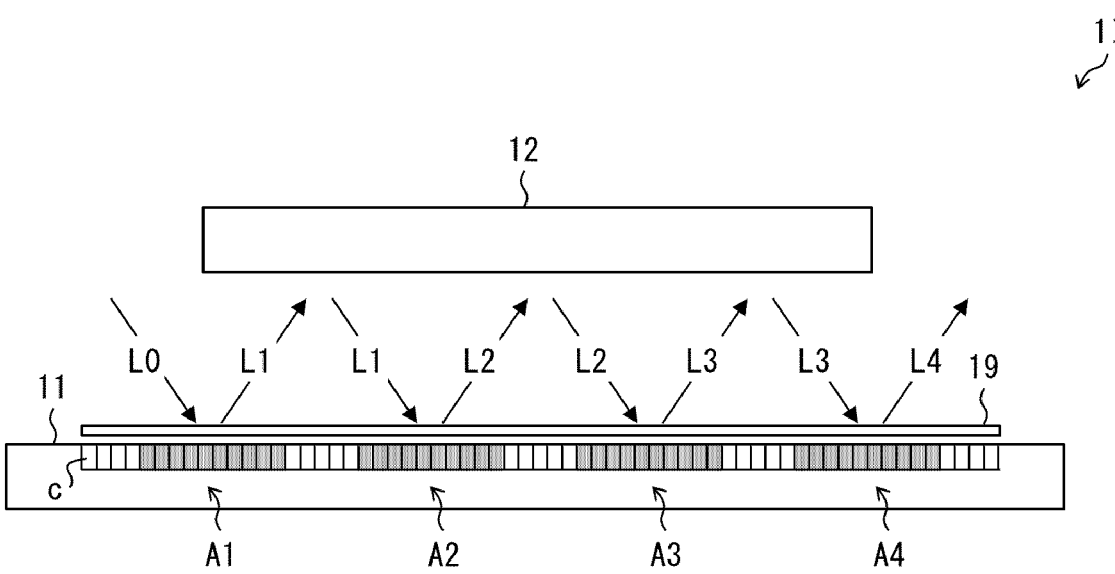
FIG. 10 is a cross-sectional view illustrating Variation 9 of the optical computing device illustrated in FIG. 1.

The following description will discuss Variation 9 of the optical computing device 1 (hereinafter referred to as an "optical computing device 1I") with reference to FIG. 10. FIG. 10 is a cross-sectional view of the optical computing device 1I.

A point in which the optical computing device 1I differs from the optical computing device 1 is that the at least one computing region An (n is any natural number not less than 1 and not more than N) is covered by a polarizing filter 19. The polarizing filter 19 selectively transmits a polarized light component of (i) the n−1th signal light Ln−1 (in a case where n=1, the incident light L0) that enters the nth computing region An and (ii) the nth signal light Ln that outgoes from the nth computing region An, the polarized light component having a specific polarization direction. In the example illustrated in FIG. 10, all computing regions A1 to AN are covered by the polarizing filter 19.

A cell C can carry out desired optical computing when a polarized light component having a specific polarization direction enters the cell C, but may be unable to carry out the desired optical computing when a polarized light component having a polarization direction different from the specific polarization direction enters the cell C. According to the optical computing device 1I, desired optical computing can be achieved even in a case where the nth computing region An is constituted by such a cell C.

Note that the polarizing filter 19 can be provided so as to be in contact with the surface of the optical modulation element 11, or can be provided so as to be spaced away from the surface of the optical modulation element 11. In either case, it still stands true that the effect described above can be obtained.

(Variation 10 of Optical Computing Device)

Figure 11:
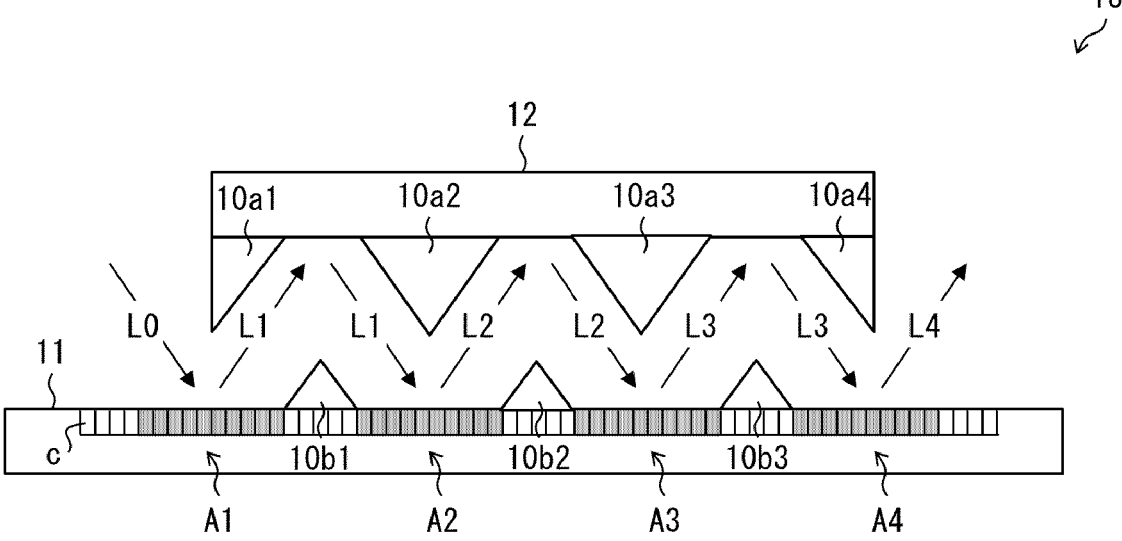
FIG. 11 is a cross-sectional view illustrating Variation 10 of the optical computing device illustrated in FIG. 1.

The following description will discuss Variation 10 of the optical computing device 1 (hereinafter referred to as an "optical computing device 1J") with reference to FIG. 11. FIG. 11 is a cross-sectional view of the optical computing device 1J.

A point in which the optical computing device 1J differs from the optical computing device 1 is that an optical absorber is added which is configured to prevent, for at least one set of computing regions Am and Am+1 (m is any natural number not less than 1 and not more than N−1), mth signal light Lm having been modulated and reflected by the mth computing region Am from entering a cell C different from a cell C constituting an m+1th computing region Am+1.

In the example illustrated in FIG. 11, optical absorbers 10a1, 10a2, and 10b1 are added as optical absorbers for preventing the first signal light L1 from entering a cell different from a cell C constituting the second computing region A2. Furthermore, optical absorbers 10a2, 10a3, and 10b2 are added as optical absorbers for preventing the second signal light L2 from entering a cell C different from a cell C constituting the third computing region A3. Moreover, optical absorbers 10a3, 10a4, and 10b3 are added as optical absorbers for preventing the third signal light L3 from entering a cell C different from a cell C constituting the fourth computing region A4. Note here that the optical absorbers 10a1 to 10a4 are quadrangular prism-shaped structures attached to a surface of the mirror 12. Note also that the optical absorbers 10b1 to 10b3 are quadrangular prism-shaped structures attached to the surface of the optical modulation element 11.

According to the optical computing device 1J, it is possible to make it less likely for an error to occur in a computing result due to entry of the mth signal light into a computing region different from the mth computing region Am. In Variation 10, the quadrangular prism-shaped structures are used as the optical absorbers 10a1 to 10a4 and as the optical absorbers 10b1 to 10b3. Note, however, that a configuration of the optical absorbers is not limited to this. A similar effect can also be obtained by, for example, employing a configuration in which a plate-like optical absorber is caused to stand upright on the surface of at least one of the optical modulation element 11 and the mirror 12.

(Variation 11 of Optical Computing Device)

Figure 12:
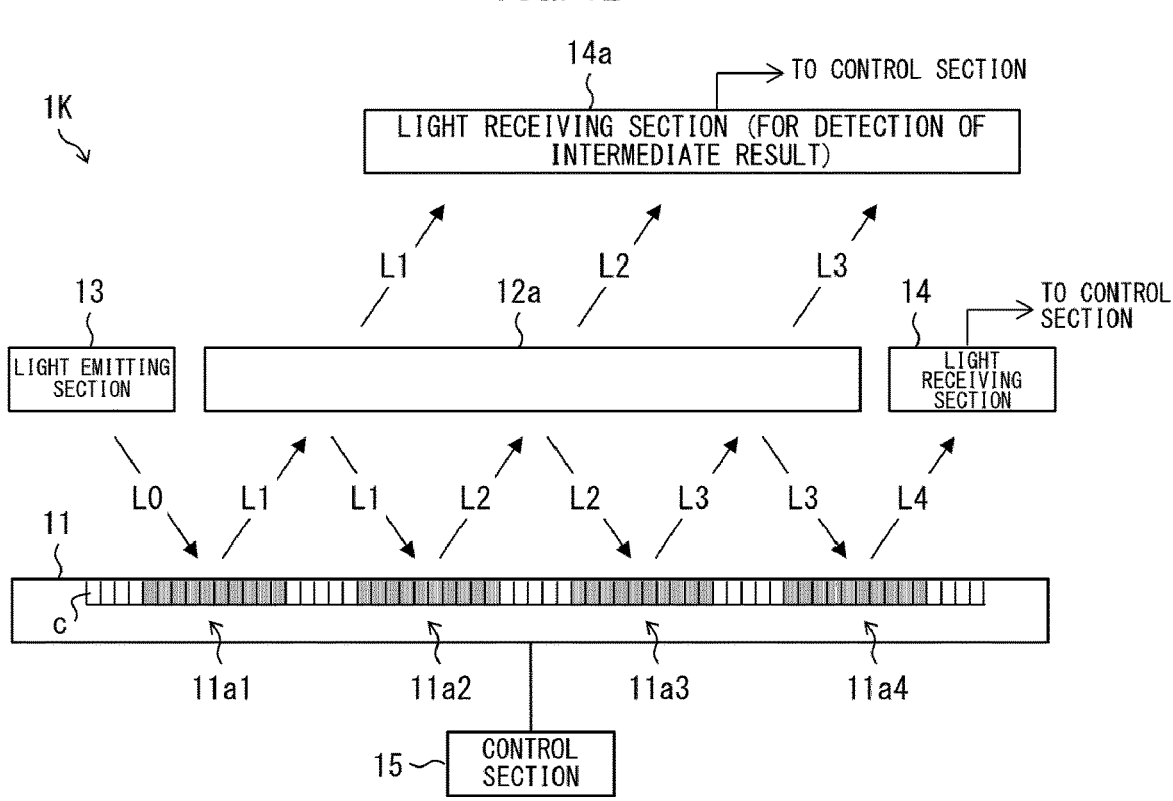
FIG. 12 is a cross-sectional view illustrating Variation 11 of the optical computing device illustrated in FIG. 1.

The following description will discuss Variation 11 of the optical computing device 1 (hereinafter referred to as an "optical computing device 1K") with reference to FIG. 12. FIG. 12 is a cross-sectional view of the optical computing device 1K.

A first point in which the optical computing device 1K differs from the optical computing device 1 is that the mirror 12 is replaced with a semi-transparent mirror 12a (an example of a "reflector" in Claims). Furthermore, a second point in which the optical computing device 1K differs from the optical computing device 1 is that for at least one computing region Am (m is any natural number not less than 1 and not more than N−1), a light receiving section 14a (an example of "another light receiving section" in Claims) configured to detect the mth signal light Lm having been modulated and reflected by the mth computing region Am and transmitted through the semi-transparent mirror 12a is added.

In the example illustrated in FIG. 12, the light receiving section 14a is added that is configured to detect the first signal light L1, the second signal light L2, and the third signal light L3 which have been modulated and reflected by the first computing region A1, the second computing region A2, and the third computing region A3, respectively, and each of which has been transmitted through the semi-transparent mirror 12a.

The optical computing device 1K makes it possible to monitor, as an intermediate result, the mth signal light Lm having been modulated and reflected by the mth computing region Am. Note that a monitoring result of the mth signal light Lm can be used to, for example, position the mth computing region.

(Variation 12 of Optical Computing Device)

Figure 13:
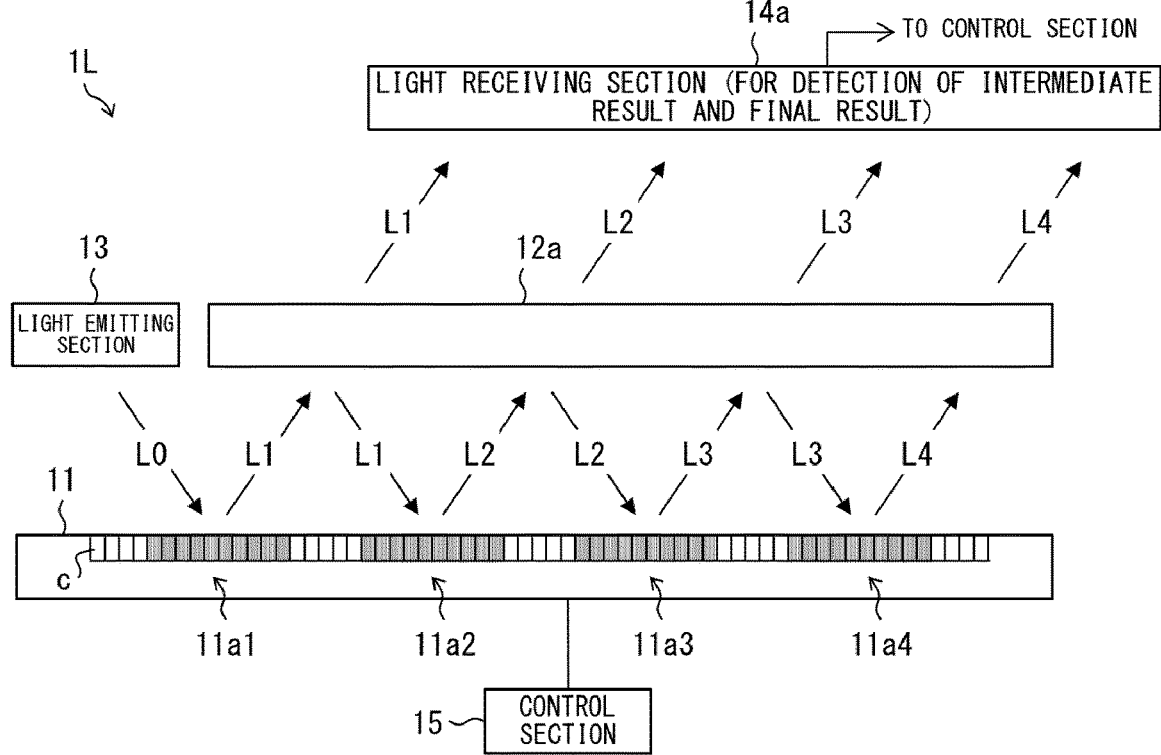
FIG. 13 is a cross-sectional view illustrating Variation 12 of the optical computing device illustrated in FIG. 1.

The following description will discuss Variation 12 of the optical computing device 1 (hereinafter referred to as an "optical computing device 1L") with reference to FIG. 13. FIG. 13 is a cross-sectional view of the optical computing device 1L.

A first point in which the optical computing device 1L differs from the optical computing device 1K is that the light receiving section 14 is omitted. A second point in which the optical computing device 1L differs from the optical computing device 1K is that the light receiving section 14a is extended so as to receive the Nth signal light having been modulated and reflected by the Nth computing region AN.

In the example illustrated in FIG. 13, the light receiving section 14a is extended so as to receive the first signal light L1, the second signal light L2, the third signal light L3, and the fourth signal light L4 which have been modulated and reflected by the first computing region A1, the second computing region A2, the third computing region A3, and the fourth computing region A4, respectively, and each of which has been transmitted through the semi-transparent mirror 12a.

The optical computing device 1K makes it possible to use a single light receiving section 14a to (i) monitor, as an intermediate result, the mth signal light Lm having been modulated and reflected by the mth computing region Am and (ii) monitor, as a final result, the nth signal light having been modulated and reflected by the Nth computing region AN. It is therefore possible to achieve a function equivalent to the function of the optical computing device 1K with a configuration simpler than the configuration of the optical computing device 1K.

(Configuration of Optical Computing Device)

The following description will discuss an optical computing device 2 in accordance with one or more embodiments of the present invention with reference to FIGS. 14A-14C. FIG. 14A is a cross-sectional view of the optical computing device 2, FIG. 14B is a plan view of a first optical modulation element 21 of the optical computing device 2, and FIG. 14C is a plan view of a second optical modulation element 22 of the optical computing device 2.

As illustrated in FIGS. 14A-14C, the optical computing device 2 includes the first optical modulation element 21 (an example of an "optical modulation element" in Claims) and the second optical modulation element 22 (an example of "another optical modulation element" in Claims). The first optical modulation element 21 and the second optical modulation element 22 are provided so that one (a main surface on the upper side of the drawing in FIG. 14A) of the first optical modulation element 21 and one (a main surface on the lower side of the drawing in FIG. 14A) of main surfaces of the second optical modulation element 22 face each other in parallel with each other.

The first optical modulation element 21 includes a plurality of cells C in which modulation amounts are independently configurable. One or more embodiments uses, as the first optical modulation element 21, a substrate including the plurality of cells C that are provided in a matrix pattern. The second optical modulation element 22 includes a plurality of cells C' in which modulation amounts are independently configurable. One or more embodiments uses, as the second optical modulation element 22, a substrate including the plurality of cells C' that are provided in a matrix pattern. A cell C and a cell C' are each a reflective modulator that has a phase modulation function or an intensity modulation function. The cell C and the cell C' are each a microcell that has a size on the order of micrometers or smaller, i.e., a size of less than 10 μm. The size of the cell C has a lower limit that is not particularly limited but is, for example, 1 nm. Specific examples of the cell C and the cell C' will be described later with reference to another drawing.

N computing regions A1, A2, . . . , AN are provided for the first optical modulation element 21. Each computing region Aj (j is a corresponding natural number not less than 1 and not more than N) is a region on a main surface of the first optical modulation element 21 and is constituted by the plurality of cells C that are provided in a matrix pattern. N−1 computing regions A1', A2', . . . , AN−1' are provided for the second optical modulation element 22. Each computing region Ak' (k is a corresponding natural number not less than 1 and not more than N−1) is a region on a main surface of the second optical modulation element 22 and is constituted by the plurality of cells C' that are provided in a matrix pattern. In FIG. 14, the cells C constituting the each computing region Aj are hatched so as to be distinguished from the other cells C. Furthermore, in FIG. 14, the cells C' constituting each computing region Aj' are hatched so as to be distinguished from the other cells C'. The following description makes an assumption that N=4. Note, however, that this assumption does not limit the present invention.

A first computing region A1 of the first optical modulation element 21 carries out first optical computing by modulating and reflecting incident light L0. Note here that carrying out the first optical computing means that signal light L1 in which a spatial intensity distribution indicates a result of the first optical computing is generated by causing light having been modulated and reflected by the respective cells C constituting the first computing region A1 to interfere with each other. Here, details of the first optical computing are determined in accordance with modulation amounts in the respective cells C constituting the first computing region A1. The signal light L1 that has been generated by the first computing region A1 enters a first computing region A1' of the second optical modulation element 22.

The first computing region A1' of the second optical modulation element 22 carries out second optical computing by modulating and reflecting the signal light L1. Note here that carrying out the second optical computing means that signal light L1' in which a spatial intensity distribution indicates a result of the second optical computing is generated by causing light having been modulated and reflected by the respective cells C' constituting the first computing region A1 to interfere with each other. Here, details of the second optical computing are determined in accordance with modulation amounts in the respective cells C' constituting the first computing region A1'. The signal light L1' that has been generated by the first computing region A1' enters a second computing region A2 of the first optical modulation element 21.

The second computing region A2 of the first optical modulation element 21 carries out third optical computing by modulating and reflecting the signal light L1'. Note here that carrying out the third optical computing means that signal light L2 indicative of a result of the third optical computing is generated by causing light having been modulated and reflected by the respective cells C constituting the second computing region A2 to interfere with each other. Here, details of the third optical computing are determined in accordance with modulation amounts in the respective cells C constituting the second computing region A2. The signal light L2 that has been generated by the second computing region A2 enters a second computing region A2' of the second optical modulation element 22.

The second computing region A2' of the second optical modulation element 22 carries out fourth optical computing by modulating and reflecting the signal light L2. Note here that carrying out the fourth optical computing means that signal light L2' indicative of a result of the fourth optical computing is generated by causing light having been modulated and reflected by the respective cells C' constituting the second computing region A2 to interfere with each other. Here, details of the fourth optical computing are determined in accordance with modulation amounts in the respective cells C constituting the second computing region A2. The signal light L2' that has been generated by the second computing region A2' enters a third computing region A3 of the first optical modulation element 21.

The third computing region A3 of the first optical modulation element 21 carries out fifth optical computing by modulating and reflecting the signal light L2'. Note here that carrying out the fifth optical computing means that signal light L3 indicative of a result of the fifth optical computing is generated by causing light having been modulated and reflected by the respective cells C constituting the third computing region A3 to interfere with each other. Here, details of the fifth optical computing are determined in accordance with modulation amounts in the respective cells C constituting the third computing region A3. The signal light L3 that has been generated by the third computing region A3 enters a third computing region A3' of the second optical modulation element 22.

The third computing region A3' of the second optical modulation element 22 carries out sixth optical computing by modulating and reflecting the signal light L3. Note here that carrying out the sixth optical computing means that signal light L3' indicative of a result of the sixth optical computing is generated by causing light having been modulated and reflected by the respective cells C' constituting the third computing region A3' to interfere with each other. Here, details of the sixth optical computing are determined in accordance with modulation amounts in the respective cells C' constituting the third computing region A3'. The signal light L3' that has been generated by the third computing region A3' enters a fourth computing region A4 of the first optical modulation element 21.

The fourth computing region A4 of the first optical modulation element 21 carries out seventh optical computing by modulating and reflecting the signal light L3'. Note here that carrying out the seventh optical computing means that signal light L4 indicative of a result of the seventh optical computing is generated by causing light having been modulated and reflected by the respective cells C constituting the fourth computing region A4 to interfere with each other. Here, details of the seventh optical computing are determined in accordance with modulation amounts in the respective cells C constituting the fourth computing region A4. The signal light L4 that has been generated by the fourth computing region A4 enters, for example, a light receiving section 24 (described later).

A conventional optical computing device includes a plurality of optical modulation elements (of a transmission type) each having a single computing region. Thus, alignment adjustment between computing regions necessary for achievement of desired multiple-stage optical computing requires physical positioning of the optical modulation elements. This makes it relatively difficult to carry out the alignment adjustment between the computing regions with high accuracy, so that it is difficult to achieve desired multiple-stage optical computing.

In contrast, the optical computing device 2 in accordance with one or more embodiments includes the first optical modulation element 21 (of a reflection type) having a plurality of computing regions A1, A2, . . . , AN and the second optical modulation element 22 (of a reflection type) having a plurality of computing regions A1', A2', . . . , AN−1. Thus, mere physical positioning of the first optical modulation element 21 and the second optical modulation element 22 makes it possible to carry out alignment adjustment between computing regions necessary for achievement of desired multiple-stage optical computing. This makes it relatively easy to carry out the alignment adjustment between the computing regions with high accuracy, so that it is relatively easy to achieve desired multiple-stage optical computing.

Note that the incident light L0 can be signal light that has been subjected to spatial intensity modulation by an input signal, or can be carrier light that has not been subjected to the spatial intensity modulation by any input signal. In the former case, a spatial intensity distribution of an output signal obtained by demodulating signal light LN indicates a result obtained by sequentially applying, to the input signal, the first optical computing, the second optical computing, . . . , 2N−1th optical computing. In the latter case, the signal light L1 that has been subjected to the spatial intensity modulation by the input signal is generated in the first computing region A1. In this case, a spatial intensity distribution of an output signal obtained by demodulating the signal light LN indicates a result obtained by sequentially applying, to the input signal, the second optical computing, the third optical computing, . . . , the 2N−1th optical computing.

The optical computing device 2 can further include a light emitting section 23 as indicated by a dotted line in FIG. 14. The light emitting section 23 is configured to generate the incident light L0 (described earlier) (e.g., to convert an electrical signal indicative of an input signal into the incident light L0). The light emitting section 23 can be, for example, a two-dimensional display including a plurality of light emitting cells that are provided in a matrix pattern.

The optical computing device 2 can further include a light receiving section 24 as indicated by a dotted line in FIG. 14. The light receiving section 24 is configured to detect the signal light LN (e.g., to convert the signal light LN into an electrical signal indicative of an output signal). The light receiving section 24 can be, for example, a two-dimensional image sensor including a plurality of light receiving cells that are provided in a matrix pattern.

The optical computing device 2 can further include a control section 25 as indicated by a dotted line in FIG. 1. The control section 25 is configured to control, in accordance with the signal light LN, modulation amounts in a cell C and a cell C' that are included in the optical modulation element 21 and the optical modulation element 22, respectively. The control section 25 can be constituted by, for example, an integrated circuit (IC) that operates in accordance with an electrical signal obtained in the light receiving section 24. Examples of the control, details of which are not particularly limited, include control for adjusting alignment between computing regions so as to obtain the signal light LN indicative of a desired output signal. In a case where the optical computing device 2 is used as a learned model, this control can also be used for learning for building that learned model.

Variations similar to Variations 1 to 10 of one or more embodiments can also be applied to the optical computing device 2. In order to apply these variations to the optical computing device 2, it is only necessary to (i) read the optical modulation element 11 of one or more embodiments as the first optical modulation element 21 of one or more embodiments and (ii) read the mirror 12 of one or more embodiments as the second optical modulation element 22 of one or more embodiments.

(Variation 1 of Optical Computing Device)

Figures 15, 16:
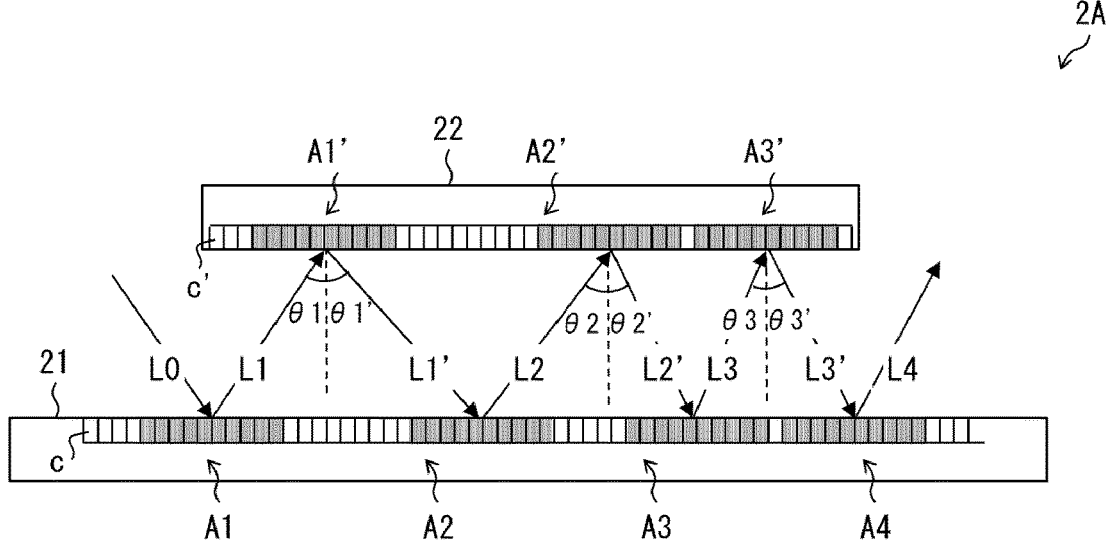
FIG. 15 is a cross-sectional view illustrating Variation 1 of the optical computing device illustrated in FIG. 14.
FIG. 16 is a cross-sectional view illustrating Variation 2 of the optical computing device illustrated in FIG. 14.

The following description will discuss Variation 1 of the optical computing device 2 (hereinafter referred to as an "optical computing device 2A") with reference to FIG. 15. FIG. 15 is a cross-sectional view of the optical computing device 2A.

A point in which the optical computing device 2A differs from the optical computing device 2 is that at least one computing region An' (n is any natural number not less than 1 and not more than N−1) is configured to reflect signal light Ln, which has entered the at least one computing region An' at an incidence angle θn with respect to a normal line to a surface of the optical modulation element 21, at a reflection angle $\theta n'$ with respect to the normal line, the reflection angle $\theta n'$ being different from the incidence angle $\theta n$.

In the example illustrated in FIG. 15, the first computing region A1' is configured to reflect the signal light L1, which has entered the first computing region A1' at an incidence angle $\theta 1$, at a reflection angle $\theta 1'$ greater than the incidence angle $\theta 1$. Furthermore, the second computing region A2' is configured to reflect the signal light L2, which has entered the second computing region A2' at an incidence angle $\theta 2$, at a reflection angle $\theta 2'$ smaller than the incidence angle $\theta 2$.

In a case where an nth computing region An' reflects the signal light Ln, which has entered the nth computing region An' at the incidence angle $\theta n$, at the reflection angle $\theta n'$ greater than the incidence angle $\theta n$, an optical distance from the nth computing region An' to an n+1th computing region An+1 can be made relatively great. In contrast, in a case where the nth computing region An' reflects the signal light Ln, which has entered the nth computing region An' at the incidence angle $\theta n$, at the reflection angle $\theta n'$ smaller than the incidence angle $\theta n$, the optical distance from the nth computing region An' to the n+1th computing region An+1 can be made relatively small. That is, appropriate setting of the reflection angle $\theta n'$ in the nth computing region An' makes it possible to freely adjust the optical distance from the nth computing region An' to the n+1th computing region An+1.

(Variation 2 of Optical Computing Device)

The following description will discuss Variation 2 of the optical computing device 2 (hereinafter referred to as an "optical computing device 2B") with reference to FIG. 16. FIG. 16 is a cross-sectional view of the optical computing device 2B.

A first point in which the optical computing device 2B differs from the optical computing device 2 is that the optical computing device 2B includes a triangular prism 26. A second point in which the optical computing device 2B differs from the optical computing device 2 is that (1) the first optical modulation element 21 is provided so as to face a first side surface 26*a* (an example of a "first surface" in Claims) of the prism 26 and (2) the second optical modulation element 22 is provided so as to face a second side surface 26*b* (an example of a "second surface" in Claims) of the prism 26.

A third side surface 26*c* of the prism 26 (1) partially reflects signal light Lk having been modulated and reflected by a kth computing region Ak of the first optical modulation element 21 and guides the partially reflected signal light Lk to a kth computing region Ak' of the second optical modulation element 22 and (2) partially reflects signal light Lk' having been modulated and reflected by a kth computing region Ak' of the second optical modulation element 22 and guides the partially reflected signal light Lk' to a k+1th computing region Ak+1 of the first optical modulation element 21. Note that the third side surface 26*c* of the prism 26 partially reflects Nth signal light LN having been modulated and reflected by an Nth computing region AN of the first optical modulation element 21. The Nth signal light LN that has been reflected by the third side surface 26*c* of the prism 26 is to be absorbed by an optical absorber 27.

A third point in which the optical computing device 2B differs from the optical computing device 2 is that the light receiving section 24 is replaced with a light receiving section 24*a*. The light receiving section 24*a* (1) detects the signal light Lk having been modulated and reflected by the kth computing region Ak of the first optical modulation element 21 and transmitted through the third side surface 26*c* of the prism 26 and (2) detects the signal light Lk' having been modulated and reflected by the kth computing region Ak' of the second optical modulation element 22 and transmitted through the third side surface 26*c* of the prism 26.

Thus, the optical computing device 2B makes it possible to monitor, as an intermediate result, (i) the signal light Lk having been modulated and reflected by the kth computing region Ak of the first optical modulation element 21 and (ii) the signal light Lk' having been modulated and reflected by the kth computing region Ak' of the second optical modulation element 22. Furthermore, it is possible to monitor, as a final result, the signal light LN having been modulated and reflected by the Nth computing region AN of the first optical modulation element 21.

Note that Variation 2 uses, as the prism 26, a prism having a right-angled isosceles triangular bottom surface. In such a prism 26, the first side surface 26*a* (described earlier) and the second side surface 26*b* (described earlier) are two side surfaces that are orthogonal to each other, and the third side surface 26*c* (described earlier) is one side surface that intersects with these two side surfaces at an acute angle.

(Variation 3 of Optical Computing Device)

Figure 17:
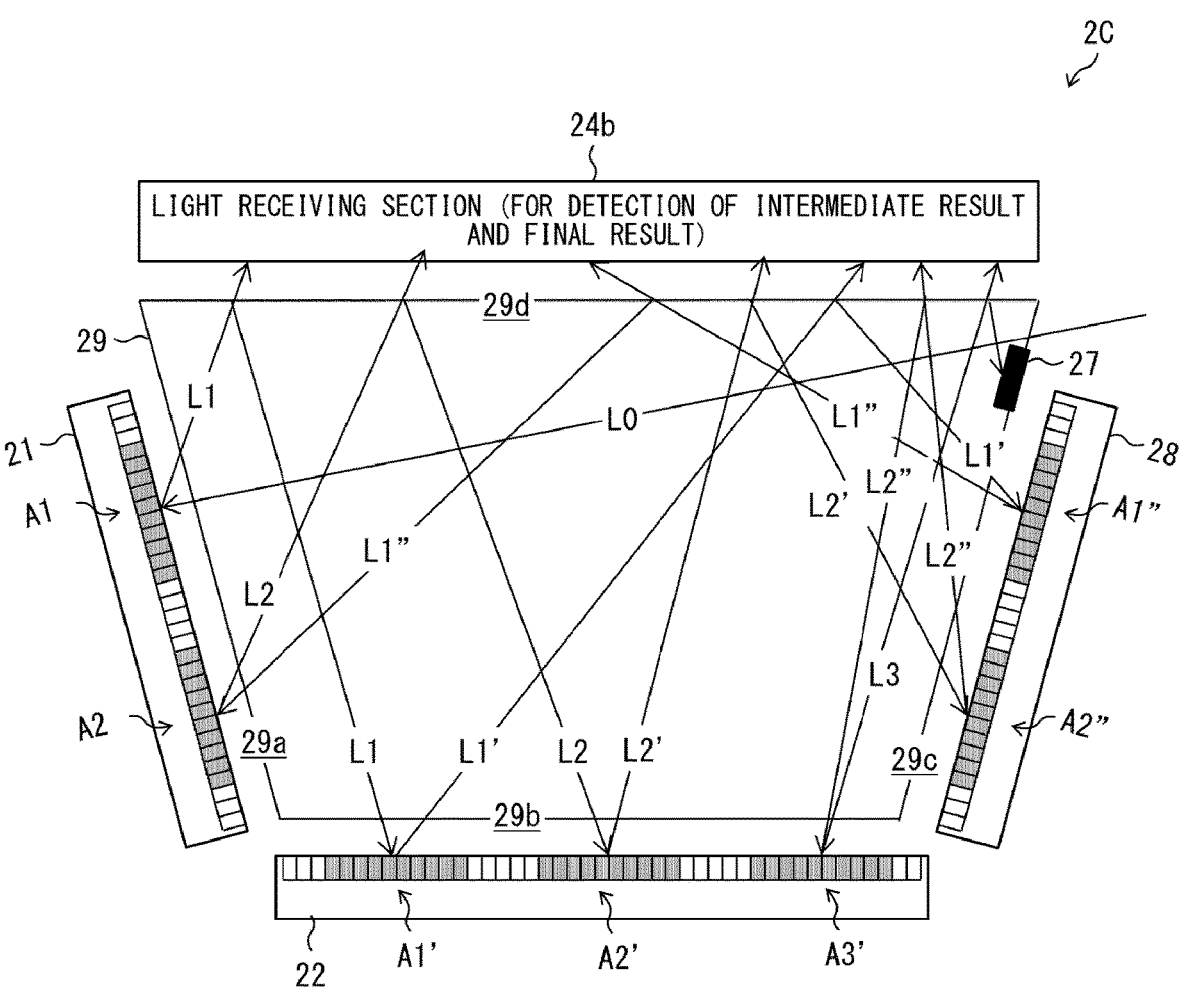
FIG. 17 is a cross-sectional view illustrating Variation 3 of the optical computing device illustrated in FIG. 14.

The following description will discuss Variation 3 of the optical computing device 2 (hereinafter referred to as an "optical computing device 2C") with reference to FIG. 17. FIG. 17 is a cross-sectional view of the optical computing device 2C.

A first point in which the optical computing device 2C differs from the optical computing device 2B is that a third optical modulation element 28 is added. The third optical modulation element 28 includes a plurality of cells C'' in which modulation amounts are independently configurable. One or more embodiments uses, as the third optical modulation element 28, a substrate including the plurality of cells C'' that are provided in a matrix pattern. A cell C'' is a reflective modulator that has a phase modulation function or an intensity modulation function. The cell C'' is a microcell that has a size on the order of micrometers or smaller, i.e., a size of less than 10 $\mu$m. The size of the cell C has a lower limit that is not particularly limited but is, for example, 1 nm. Specific examples of the cell C'' will be described later with reference to another drawing.

N−1 computing regions A1'', A2'', . . . , AN−1'' are provided for the third optical modulation element 28. Each computing region Ak'' (k is a corresponding natural number not less than 1 and not more than N−1) is a region on a main surface of the third optical modulation element 28 and is constituted by the plurality of cells C'' that are provided in a matrix pattern.

A second point in which the optical computing device 2C differs from the optical computing device 2B is that the triangular prism 26 is replaced with a quadrangular prism 29. A third point in which the optical computing device 2C differs from the optical computing device 2B is that (1) the first optical modulation element 21 is provided so as to face a first side surface 29*a* (an example of the "first surface" in Claims) of the prism 29, (2) the second optical modulation element 22 (an example of "one of the two other optical modulation elements" in Claims) is provided so as to face a second side surface 29*b* (an example of the "second surface" in Claims) of the prism 29, and (3) the third optical modulation element 28 (an example of "the other one of the two other optical modulation elements" in Claims) is provided so as to face a third side surface 29*c* (an example of a "third surface" in Claims) of the prism 29.

A fourth side surface 29*d* of the prism 29 (1) partially reflects the signal light Lk having been modulated and reflected by the kth computing region Ak of the first optical modulation element 21 and guides the partially reflected signal light Lk to the computing region Ak' of the second optical modulation element 22, (2) partially reflects the signal light Lk' having been modulated and reflected by the kth computing region Ak' of the second optical modulation element 22 and guides the partially reflected signal light Lk' to a kth computing region Ak" of the third optical modulation element 28, and (3) partially reflects signal light Lk" having been modulated and reflected by the kth computing region Ak" of the third optical modulation element 28 and guides the partially reflected signal light Lk" to the k+1th computing region $A_{k+1}$ of the first optical modulation element 21. Note that the fourth side surface 29*d* of the prism 29 partially reflects the Nth signal light LN having been modulated and reflected by the Nth computing region AN of the first optical modulation element 21. The Nth signal light LN that has been reflected by the fourth side surface 29*d* of the prism 29 is to be absorbed by the optical absorber 27.

A fourth point in which the optical computing device 2C differs from the optical computing device 2B is that the light receiving section 24*a* is provided so as to face the fourth side surface 29*d* (an example of a "fourth surface" in Claims) of the prism 29. The light receiving section 24*a* (1) detects the signal light Lk having been modulated and reflected by the kth computing region Ak of the first optical modulation element 21 and transmitted through the fourth side surface 29*d* of the prism 29, (2) detects the signal light Lk' having been modulated and reflected by the kth computing region Ak' of the second optical modulation element and transmitted through the fourth side surface 29*d* of the prism 29, and (3) detects the signal light Lk" having been modulated and reflected by the kth computing region Ak" of the third optical modulation element 28 and transmitted through the fourth side surface 29*d* of the prism 29.

Thus, the optical computing device 2C makes it possible to monitor, as an intermediate result, (i) the signal light Lk having been modulated and reflected by the kth computing region Ak of the first optical modulation element 21, (ii) the signal light Lk' having been modulated and reflected by the kth computing region Ak of the second optical modulation element 22, and (iii) the signal light Lk" having been modulated and reflected by the kth computing region Ak" of the third optical modulation element 28. Furthermore, it is possible to monitor, as a final result, the signal light LN having been modulated and reflected by the Nth computing region AN of the first optical modulation element 21.

Note that Variation 3 uses, as the prism 29, a prism having an isosceles trapezoidal bottom surface. In such a prism 29, the second side surface 29*b* (described earlier) and the fourth side surface 29*d* (described earlier) are two side surfaces that are parallel to each other. Furthermore, the first side surface 29*a* (described earlier) and the third side surface 29*c* (described earlier) are two side surfaces each of which intersects with the second side surface 29*b* at an obtuse angle and intersects with the fourth side surface 29*d* at an acute angle.

Note that an incidence angle and a reflection angle of signal light differ from each other in the each computing region Ak of the first optical modulation element 21. This is because as in the case of Variation 4 of one or more embodiments, the computing region Ak is designed so that an incidence angle and a reflection angle of signal light differ from each other. It can be said that the same applies to the each computing region Ak' of the second optical modulation element 22 and the each computing region Ak" of the third optical modulation element 28.

[Specific Examples 1 and 2 of Cell]

The following description will discuss, with reference to FIGS. 18 and 19, a cell C1, which is Specific Example 1 of the cell C, C', C'. FIG. 18 is a perspective view of the cell C1. (a) of FIG. 19 is a cross-sectional view of the cell C1. (b) of FIG. 19 is a plan view of a polarizing plate P11, the plan view illustrating a direction of a transmission axis A11 of the polarizing plate P11. The following description will discuss, with reference to FIG. 20, a cell C2, which is Specific Example 2 of the cell C. (a) of FIG. 20 is a cross-sectional view of the cell C2. (b) of FIG. 20 is a plan view of polarizing plates P21 and P22, the plan view illustrating directions of respective transmission axes A21 and A22 of the polarizing plates P21 and P22.

As will be described in detail later, a magnetized fixed layer C15 and a magnetized fixed layer C25 each of which is of an in-plane magnetization type are employed in the cell C1 and the cell C2, respectively. However, in the magnetized fixed layer C15 and the magnetized fixed layer C25, which are of the same in-plane magnetization type, magnetization directions are orthogonal to each other in a plane. Except for this configuration of the magnetized fixed layers, the cell C1 and the cell C2 are similarly configured. That is, a block C13, a spacer layer C14, the magnetized fixed layer C15, an electrode C16, and an electrode C17 of the cell C1 correspond to a block C23, a spacer layer C24, the magnetized fixed layer C25, an electrode C26, and an electrode C27, respectively, of the cell C2. Thus, Specific Examples 1 and 2 use the cell C1 to discuss a specific example of the cell C, and discuss, for the cell C2, (i) the magnetization direction in the magnetized fixed layer C25 and (ii) how to induce magnetization of the block C23 caused by magnetization in the magnetized fixed layer C25.

In Specific Examples 1 and 2, visible light having a wavelength of 400 nm to 800 nm is employed as each of (i) light L11 (see FIG. 19) that is caused to enter the cell C1 and (ii) light L12 that is caused to enter the cell C2. However, the wavelength of the light L11, L12 is not limited to a visible light wavelength and can be selected as appropriate from, for example, an ultraviolet region wavelength and a near infrared region wavelength.

(Configuration of Cell)

As illustrated in FIG. 18, the cell C1 includes a substrate C12, the block C13, the spacer layer C14, the magnetized fixed layer C15, the electrode C16, and the electrode C17.

In FIGS. 18 and 19, a direction from an optically effective surface C133 toward the outside of the block C13 among directions normal to the optically effective surface C133 of the block C13 is regarded as an x-axis positive direction. Furthermore, a direction that is normal to a surface C131 and a surface C132 of the block C13 and that extends from the surface C131 toward the surface 132 is regarded as a z-axis positive direction. Moreover, a direction that together with the x-axis positive direction and the z-axis positive direction, constitutes a right-handed orthogonal coordinate system is regarded as a y-axis positive direction.

As illustrated in (a) of FIG. 19, in the cell C1, the light L11 enters the optically effective surface C133 from a direction inclined, by an incidence angle, from an x-axis direction perpendicular to the optically effective surface C133 to the z-axis positive direction. Note that the polarizing plate P11 is provided so as to be followed by the block C13 when viewed from the light L1. Light that has entered the optically effective surface C133 propagates through the inside of the block C13 in a direction toward the substrate C12 (approximately an x-axis negative direction), is reflected at a boundary surface between the block C13 and the substrate C12, and propagates through the inside of the block C13 in a direction toward the optically effective surface C133 (approximately the x-axis positive direction), and outgoes, as the light L12, from the optically effective surface C133. The light L12 outgoes, from the optically effective surface C133, in a direction inclined, by an outgoing angle corresponding to the incidence angle, from the x-axis direction perpendicular to the optically effective surface C133 to a z-axis negative direction. Note that (a) of FIG. 19 does not illustrate an optical path inside the block C13. In Specific Example 1, the incidence angle and the outgoing angle are each 10°. Note, however, that the incidence angle and the outgoing angle, neither of which is limited to 10°, can be determined as appropriate.

(Substrate)

The substrate C12 is a plate-like member configured such that a main surface (x-axis positive direction side main surface) that is in contact with the block C13 regularly reflects light. The substrate C12 is made of a material that is not particularly limited. Note, however, that the substrate C12 has at least a main surface made of a material that reflects light. The main surface is may be configured flat so as to regularly reflect light. Specific Example 1 employs, as the substrate C12, quartz glass that has a main surface on which an aluminum thin film is provided. Note, however, that a reflecting member does not necessarily need to be made of aluminum and can be (i) a metallic film different from an aluminum film or (ii) a dielectric multilayered film. Furthermore, the substrate C12 is not limited to this and can be a plate-like member that is made of a metal or a semiconductor and that has a main surface having been finished so as to be a mirror surface. Examples of the metal of which the substrate C12 is made include aluminum and copper, and examples of the semiconductor of which the substrate C12 is made include silicon.

The block C13 has a reflecting surface C134 that is fixed to the x-axis positive direction side main surface of the substrate C12. In one or more embodiments, a resin is used as a fixing member for fixing the substrate C12 and the block C13 to each other. Note, however, that the fixing member is not limited to this.

(Block)

The block C13 is made of a material that is light-transmissive to the light L11. Furthermore, the block C13 contains a magnetic atom. The block C13 has a magnetization state that is not fixed. Thus, the block C13 only needs to be made of a material whose magnetic susceptibility can be easily changed by spin injection. Examples of the material of which the block C13 is made include various materials such as a paramagnetic material and a ferromagnetic material. In order to achieve higher magnetic susceptibility, the block C13 may be configured so as to exhibit ferromagnetism at room temperature (e.g., 25° C.) and is suitably made of a ferromagnetic material that has a relatively high spin polarizability. The spin polarizability may be, for example, not less than 50%. One or more embodiments employs CoFeB as the material of which the block C13 is made. Note, however, that not only CoFeB but also CoFe, NiFe, Fe, Ni, Co, or the like can be suitably used. Furthermore, the block C13 does not need to be composed of a single composition. It is also possible to employ an insulator (e.g., alumina or glass) to which fine particles (described earlier) are added.

As will be described later, the magnetized fixed layer C15 is also made of a material that exhibits ferromagnetism (more specifically, hard magnetism). Note here that the block C13 has a smaller coercive force than the magnetized fixed layer C15. This makes it possible to change a direction of magnetization M13 of the block C13 while fixing a direction of magnetization M15 in the magnetized fixed layer C15. The magnetization M13 can take a direction the same as or opposite to that of the magnetization M15 among directions parallel or substantially parallel to the magnetization M15.

CoFeB that is employed, in Specific Example 1, as the material of which the block C13 is made is an example of a ferromagnetic material that has a sufficiently small coercive force at room temperature and in which remanent magnetization is sufficiently small at room temperature (i.e., a soft magnetic material). The material of which the block C13 is made is not limited to a soft magnetic material. Note, however, that the block C13 that is made of a soft magnetic material allows remanent magnetization in which magnetization remains in the block C13 to be sufficiently small with respect to saturated magnetization at room temperature in a case where injection of polarized electrons is stopped. Thus, in a case where the block C13 that is volatile is used, the block C13 may be made of a ferromagnetic material in which remanent magnetization at room temperature is sufficiently small with respect to saturated magnetization at room temperature. Note here that the expression "remanent magnetization at room temperature is sufficiently small with respect to saturated magnetization at room temperature" means, for example, that remanent magnetization at room temperature is not less than 0% and less than 10% of saturated magnetization at room temperature.

According to this configuration, in a case where spin-polarized electrons are injected into the block C13, magnetic interaction occurs between magnetic atoms contained in the block C13, so that the magnetization M13 occurs. In contrast, in a case where injection of spin-polarized electrons into the block C13 is stopped, the interaction occurring between the magnetic atoms contained in the block C13 disappears, so that the magnetization M13 also disappears. Thus, according to this configuration, injection of spin-polarized electrons can be used to cause the magnetization M13 to occur or disappear in a volatile manner. This allows the cell C1 to control a degree of phase delay in a component that is contained in light propagating through the inside of the block C13 and whose polarization plane is parallel to a zx plane.

Note that a ferromagnetic material in which remanent magnetization at room temperature is relatively large with respect to saturated magnetization at room temperature (i.e., a hard magnetic material) can be used in the block C13. Note here that the expression "remanent magnetization at room temperature is relatively large with respect to saturated magnetization at room temperature" means, for example, that remanent magnetization at room temperature is not less than 90% and not more than 100% of saturated magnetization at room temperature.

According to this configuration, the magnetization M13 that has been caused by injection of spin-polarized electrons does not disappear but remains after the injection of spin-polarized electrons is stopped. Thus, in a case where this configuration is employed, a phase in a component whose polarization plane is parallel to the zx plane can be delayed in a non-volatile manner even after the injection of spin-polarized electrons is stopped.

In Specific Example 1, a proportion of remanent magnetization at room temperature to saturated magnetization at room temperature in the material of which the block C13 is made is not limited to not less than 0% and less than 10% or not less than 90% and not more than 100%, and can be not less than 10% and less than 90%.

In a case where the block C13 exhibits paramagnetism, the magnetization M13 can take various directions. Note, however, that, in a case where spin-polarized electrons are injected into the block C13, the magnetization M13 in a macro perspective can take a direction which is parallel or substantially parallel to the magnetization M15 and which is the same as or opposite to that of the magnetization M15.

The block C13 has a rectangular parallelepiped shape. Thus, the block C13 has six surfaces. Note, however, that the shape of the block C13 is not limited to a rectangular parallelepiped shape and can be a rectangular parallelepiped-like shape. As will be described later, the optically effective surface C133 and the reflecting surface C134 each have a shape that is not limited to a rectangular shape or a rectangle-like shape.

In the block C13, two planes that are parallel to an xy plane and that face each other are regarded as surfaces C131 and C132 (see FIG. 18). The surfaces C131 and C132 are examples of the first plane and the second plane, respectively. Furthermore, two planes that are parallel to a yz plane and that face each other are regarded as the optically effective surface C133 and the reflecting surface C134.

In a case where the optically effective surface C133 and the reflecting surface C134 are regarded as a pair of bottom surfaces, the block C13 can also be referred to as a columnar microcell. Note here that a microcell refers to a cell having a cell size of less than 10 µm. Note also that the term "cell size" refers to a square root of an area of the optically effective surface C133 and the reflecting surface C134. The optically effective surface C133 and the reflecting surface C134 each have a shape that may be a rectangular shape or a rectangle-like shape. Note that this shape may include at least a pair of parallel sides and can be a trapezoid shape or a parallelogram shape.

In the following description, a length of a side included in sides of the block C13 and extending in the x-axis direction (a thickness of the block C13) is denoted as a length L1, a length of a side included in the sides of the block C13 and extending in a y-axis direction (a length of a first side of each of the optically effective surface C133 and the reflecting surface C134) is denoted as a length L2, and a length of a side included in the sides of the block C13 and extending in a z-axis direction (a length of a second side of each of the optically effective surface C133 and reflecting surface C134) is denoted as a length L3 (see FIG. 18).

In Specific Example 1, the length L1 is approximately 1 µm, and the lengths L2 and L3 are each approximately 800 nm. However, the lengths L1, L2, and L3 are not limited to these. The lengths L2 and L3 can be determined as appropriate within a range in which the cell size is less than 10 µm. Furthermore, the length L1 can be determined as appropriate. Moreover, in the block C13, by adjusting the material thereof as appropriate, it is possible to determine a refractive index so that the refractive index has a desired value.

In Specific Example 1, the optically effective surface C133 and the reflecting surface C134 are each a flat surface (i.e., a plane). Note, however, that neither the optically effective surface C133 nor the reflecting surface C134 needs to be a plane. Alternatively, the optically effective surface C133 and the reflecting surface C134 each can be provided with irregularities. Such an uneven structure can be a periodic structure or a random structure. By appropriately designing the uneven structure, it is possible to reduce reflection loss that can occur in the optically effective surface C133 and the reflecting surface C134.

(Spacer Layer)

The spacer layer C14 is a layer member that is made of an insulator. The spacer layer C14 is provided between the block C13 and the magnetized fixed layer C15 (described later) and insulates the block C13 and the magnetized fixed layer C15 from each other. The spacer layer C14, together with the block C13 and the magnetized fixed layer C15, forms a tunnel junction. This makes it possible to determine a thickness of the spacer layer C14 as appropriate within a range in which an electric current can tunnel through the tunnel junction. The spacer layer C14 typically has a thickness of not less than 2 nm and not more than 3 nm. Note, however, that the thickness of the spacer layer C14 is not limited to this. In order to exhibit a good tunnel characteristic, the spacer layer C14 may contain no pinhole and may be made of a film having a uniform thickness. Magnetization of the block C13 can be switched with lower electric power and at a higher speed by using spin-polarized electrons as a tunnel electric current carrier. Thus, the cell C1 is a spin injection type phase modulator in which the tunnel junction is used.

One or more embodiments employs an aluminum oxide ($Al_2O_3$) insulator as the insulator of which the spacer layer C14 is made. Note, however, that this insulator does not necessarily need to be an aluminum oxide insulator. Examples of this insulator include an insulator of which a spacer layer of a magnetoresistive random access memory (MRAM) is made. Note that the spacer layer C14 can also be omitted in the cell C1.

(Magnetized Fixed Layer)

The magnetized fixed layer C15 is a layer member that is made of an electrically conductive ferromagnetic material. In one or more embodiments, the magnetized fixed layer C15 is indirectly provided to the surface C131 via the spacer layer C14. Note, however, that the magnetized fixed layer C15 can be alternatively directly provided to the surface 131.

The ferromagnetic material of which the magnetized fixed layer C15 is made exhibits ferromagnetism at room temperature. The magnetized fixed layer C15 has a greater coercive force than the block C13. Specific Example 1 employs Permalloy, which is an alloy of nickel and iron, as the ferromagnetic material of which the magnetized fixed layer C15 is made. A compositional ratio between nickel and iron is not limited. Note, however, that the compositional ratio can be, for example, $Ni_{81}Fe_{19}$. Furthermore, this ferromagnetic material is not limited to Permalloy. Examples of this ferromagnetic material include a ferromagnetic material of which a magnetized fixed layer of an MRAM is made, such as a magnesium oxide.

Moreover, the magnetized fixed layer C15 also has a thickness that is not limited and can be determined as appropriate.

A type of the magnetized fixed layer C15 is roughly divided into an out-plane magnetization type and an in-plane magnetization type in accordance with the direction of the magnetization M15.

In the magnetized fixed layer C15 of the in-plane magnetization type, as illustrated in FIG. 19, the direction of the magnetization M15 is substantially orthogonal to a traveling direction (the x-axis direction) of the light L1 among in-plane directions of a main surface of the magnetized fixed layer C15. The magnetized fixed layer C15 which is of the in-plane magnetization type and in which the direction of the magnetization M15 is a y-axis negative direction is employed in the cell C1. Since the direction of the magnetization M13 of the block C13 is parallel to the direction of the magnetization M15, the direction of the magnetization M13 is also parallel to the y-axis direction.

Furthermore, in the cell C1, the polarizing plate P11 is provided on an optical path of the light L11, which is incident light. The transmission axis A11 of the polarizing plate P11 is oriented parallel to the z-axis direction in the yz plane as illustrated in (b) of FIG. 19. Thus, the polarizing plate P11 (i) transmits only linearly polarized light that is included in components of the light L11 and whose polarization direction is parallel to a z axis and (ii) causes the linearly polarized light to enter the optically effective surface C133.

According to this configuration, the direction of the magnetization M13 (the z-axis direction) is orthogonal or substantially orthogonal to the polarization direction of the light L11 (the z-axis direction) (see (a) of FIG. 19). Thus, since interaction with the magnetization M13 causes a transverse Kerr effect to the light L11, the cell C1 allows outgoing of the light L12 whose phase is further delayed than that of the light L11 which propagates through the inside of the block C13 in parallel to the x-axis direction. That is, the cell C1 can delay a phase of light. Note that a degree to which the block C13 is to delay the phase of the light L1 depends on a magnetic field that is formed inside the block C13. This degree therefore depends on the magnitude of the magnetization M15 and an amount of spin injection into the block C13. The cell C1 thus can modulate a phase of incident light.

Similarly, the magnetized fixed layer C25 of the in-plane magnetization type is also employed in the cell C2. In the magnetized fixed layer C25, as illustrated in (a) of FIG. 20, a direction of magnetization M25 is substantially parallel to a traveling direction (the x-axis direction) of light L21 among in-plane directions of a main surface of the magnetized fixed layer C25. In the cell C2, the magnetized fixed layer C25 is configured such that the direction of the magnetization M25 is parallel to the x-axis direction. Since a direction of magnetization M23 of the block C23 is parallel to the direction of the magnetization M25, the direction of the magnetization M23 is also parallel to the x-axis direction.

According to this configuration, the direction of the magnetization M23 (the x-axis direction) is parallel or substantially parallel to the traveling direction (the x-axis direction) of the light L21 (see (a) of FIG. 20). Thus, since interaction with the magnetization M23 causes a polar Kerr effect to the light L11, the cell C2 allows rotation of the polarization axis of the light L11 which propagates through the inside of the block C13 in parallel to the x-axis direction. In (a) of FIG. 20, the fact that arrows indicative of a polarization axis of light L22 having outgone from an optically effective surface C233 have a shorter length than arrows indicative of a polarization axis of the light L21 shows that the polarization axis rotates on an optical axis due to the polar Kerr effect and appears shorter in a case where the light is projected onto the zx plane. This allows the cell C2 to attenuate the intensity of the light L22 that has been transmitted through a polarizing plate P22. An amount of rotation of the polarization axis caused by the polar Kerr effect depends on a magnetic field that is formed inside the block C23. Thus, the cell C2 causes an amount of attenuation of light to depend on the magnitude of the magnetization M25 and an amount of spin injection into the block C23.

The cell C2 thus can modulate the intensity of incident light. That is, the cell C2 is a spin injection type intensity modulator.

(Pair of Electrodes)

Electrodes C16 and C17, which are a pair of electrodes, are each a layer member that is made of a conductor. One or more embodiments employs copper as the conductor of which the electrodes C16 and C17 are made. Note, however, that this conductor is not limited to copper. This conductor may have a higher electric conductivity. Examples of this conductor include not only copper but also silver and gold.

The electrode C16 is provided to the surface C131 via the spacer layer C14 and the magnetized fixed layer C15. Thus, the spacer layer C14, the magnetized fixed layer C15, and the electrode C16 are disposed in this order on the surface C131. Furthermore, the electrode C17 is directly provided to the surface C132. Thus, the electrodes C16 and C17 are provided so as to face each other, and the electrode C16, the magnetized fixed layer C15, the spacer layer C14, and the electrode C17 are provided in this order. It can also be said that the electrodes C16 and C17 sandwich therebetween the block C13, the spacer layer C14, and the magnetized fixed layer C15. The electrodes C16 and C17 are examples of a first electrode and a second electrode, respectively.

Either a positive electrode or a negative electrode of a power source is connected to each of the electrodes C16 and C17, and a voltage can be applied between the electrodes. The electrodes C16 and C17 are used to inject spin-polarized electrons into the block C13, so that the block C13 is magnetized. The block C13 functions as an optical path for light that propagates from the optically effective surface C133, passes through the reflecting surface C134, and propagates again toward the optically effective surface C133. Thus, the electrodes C16 and C17 can inject spin-polarized electrons into the block C13 so that a magnetic field occurs in at least a part of an optical path for light that propagates through the inside of the block C13.

[Specific Examples 3 and 4 of Cell]

The following description will discuss, with reference to FIGS. 21 and 22, a cell C3, which is Specific Example 3 of the cell C. FIG. 21 is a perspective view of the cell C3. (a) of FIG. 22 is a plan view of a polarizing plate P31, the plan view illustrating a direction of a transmission axis A31 of the polarizing plate P31. (b) of FIG. 21 is a cross-sectional view of the cell C3. The following description will discuss, with reference to FIG. 23, a cell C4, which is Specific Example 4 of the cell C. (a) of FIG. 23 is a plan view of polarizing plates P41 and P42, the plan view illustrating directions of respective transmission axes A41 and A42 of the polarizing plates P41 and P42. (b) of FIG. 23 is a cross-sectional view of the cell C4.

A magnetized fixed layer C35 of the in-plane magnetization type is employed in the cell C3, and a magnetized fixed layer C45 of the out-plane magnetization type is employed in the cell C4. Except for the configuration of the magnetized fixed layers, the cell C3 and the cell C4 are similarly configured. That is, a block C33, a spacer layer C34, the magnetized fixed layer C35, an electrode C36, and an electrode C37 of the cell C4 correspond to a block C43, a spacer layer C44, the magnetized fixed layer C45, an electrode C46, and an electrode C47, respectively, of the cell C4. Thus, Specific Examples 3 and 4 (i) use the cell C3 to discuss a specific example of the cell C and (ii) use the cell C4 to discuss only employment of the magnetized fixed layer C45 of the out-plane magnetization type.

Note that orthogonal coordinate systems illustrated in FIGS. 21, 22, and 23 are determined as in the case of the orthogonal coordinate systems illustrated in FIGS. 18 and 19.

(Configuration of Cell)

As illustrated in FIG. 21, the cell C3 includes a substrate C32, the block C33, the spacer layer C34, the magnetized fixed layer C35, the electrode C36, and the electrode C37. The substrate C32, the block C33, the spacer layer C34, the magnetized fixed layer C35, the electrode C36, and the electrode C37 correspond to the substrate C12, the block C13, the spacer layer C14, the magnetized fixed layer C15, the electrode C16, and the electrode C17, respectively, of the cell C1. Note, however, that in the cell C3, light L31 enters an optically effective surface C371 that is parallel to a main surface of the magnetized fixed layer C35. Thus, the cell C3 includes the magnetized fixed layer C35 which is of the in-plane magnetization type and in which a direction of magnetization M35 is substantially orthogonal to a traveling direction (the z-axis negative direction) of the light L31 among in-plane directions of the main surface of the magnetized fixed layer C35 and is also substantially orthogonal to a polarization direction (the x-axis direction) of the light L31. The magnetized fixed layer C35 is thus configured as in the case of the magnetized fixed layer C15 of the cell C1 except a direction in which the light L31 enters. The following description will discuss the direction in which light enters, i.e., in which direction a direction normal to the optically effective surface faces.

In the cell C1 and the cell C2, the reflecting surface C134 is fixed to the main surface of the substrate C12 in a case where the cell C1 is taken as an example (see FIG. 18). A direction in which the electrode C16, the magnetized fixed layer C15, the spacer layer C14, the block C13, and the electrode C17 are disposed in this order extends along an in-plane direction of the main surface of the substrate C12. Then, light (i) enters via the optically effective surface C133 that faces the reflecting surface C134 and (ii) outgoes. As illustrated in FIG. 18, the optically effective surface C133 is provided so as to be parallel to the yz plane.

In contrast, in the cell C3 and the cell C4, the electrode C36 is fixed to a main surface of the substrate C32 in a case where the cell C3 is taken as an example (see FIG. 21). The electrode C36, the magnetized fixed layer C35, the spacer layer C34, the block C33, and the electrode C37 are disposed in this order on the main surface of the substrate C32. That is, a direction in which the electrode C36, the magnetized fixed layer C35, the spacer layer C34, the block C33, and the electrode C37 are disposed extends along a direction normal to the main surface of the substrate C32. Then, in the cell C3 and the cell C4, light (i) enters via the optically effective surface C371, which is a z-axis positive direction side main surface of the electrode C37, and (ii) outgoes. As illustrated in FIG. 21, the optically effective surface C371 is provided so as to be parallel to the xy plane.

Thus, in the cell C3 and the cell C4, as a material of which the electrodes C37 and C47 are made, a material that is both electrically conductive and light-transmissive is employed so that light is transmitted through the cell C3 and the cell C4. A film made of a material that is both electrically conductive and light-transmissive is called a transparent electrically conductive film. Specific Examples 3 and 4 employ, as the electrodes C37 and C47, transparent electrically conductive films made of an indium tin oxide (ITO). Note that a material of which the electrodes C37 and C47 are made is not limited to an ITO provided that the material is both electrically conductive and light-transmissive.

As described above, the cell C3 and the cell C4, in which the transparent electrically conductive films are employed as the electrodes C37 and C47, differ from the cell C1 and the cell C2 in configuration in which light enters and outgoes via the respective optically effective surfaces C371 and C471. Furthermore, unlike the magnetized fixed layer C25 of the cell C2, the magnetized fixed layer C45 of the out-plane magnetization type is used in the cell C4. Except for these configurations, the cell C3 and cell C4 are similar to the cell C1 and the cell C2, respectively.

In a case where attention is paid to a magnetization direction of the magnetized fixed layer, the magnetized fixed layer C35 of the cell C3 is of the in-plane magnetization type, and the polarization direction of the light L31 and the direction of the magnetization M35 are substantially orthogonal to each other. The cell C3 therefore corresponds to the cell C1. Thus, interaction with magnetization M33 causes a transverse Kerr effect to the light L31. Moreover, since the magnetized fixed layer C45 of the cell C4 is of the out-plane magnetization type, the magnetized fixed layer C45 differs from either of the magnetized fixed layers C15 and C25. In the magnetized fixed layer C45 of the out-plane magnetization type, as illustrated in FIG. 23, a direction of magnetization M45 is parallel to a direction normal to a main surface of the magnetized fixed layer C45 (the z-axis direction). That is, since the direction of the magnetization M45 (z-axis direction) is substantially parallel to a traveling direction of light L41, interaction with the magnetization M23 causes a polar Kerr effect to the light L41.

In contrast, in a case where attention is paid to functions of the cell C3 and the cell C4, the cell C3 can modulate a phase of light due to the transverse Kerr effect. The cell C3 therefore corresponds to the cell C1. Further, the cell C4 can rotate a polarization axis due to the polar Kerr effect and consequently can modulate the intensity of light. The cell C4 therefore corresponds to the cell C2.

The following description uses the cell C3 and the cell C4 to briefly discuss a case of phase modulation and a case of intensity modulation.

(Phase Modulation)

As illustrated in (b) of FIG. 22, in the cell C3, the light L31 enters the optically effective surface C371 from a direction inclined, by an incidence angle, from the z-axis direction perpendicular to the optically effective surface C371 to the x-axis negative direction. Note that the polarizing plate P31 is provided so as to be followed by the cell C3 when viewed from the light L31. Light that has entered the optically effective surface C371 propagates through the inside of the block C33 in a direction toward the spacer layer C34 (approximately the z-axis negative direction), is reflected at a boundary surface between the block C33 and the spacer layer C34, and propagates through the inside of the block C33 in a direction toward the optically effective surface C371 (approximately the z-axis positive direction), and outgoes, as light L32, from the optically effective surface C371. The light L32 outgoes, from the optically effective surface C371, in a direction inclined, by an outgoing angle corresponding to the incidence angle, from the z-axis direction perpendicular to the optically effective surface C371 to the x-axis negative direction. Note that (b) of FIG. 22 does not illustrate an optical path inside the block C33. In Specific Example 3, the incidence angle and the outgoing angle are each 10°. Note, however, that the incidence angle and the outgoing angle, neither of which is limited to 10°, can be determined as appropriate.

In a case where the cell C3 is used to modulate a phase of the light L31, the polarizing plate P31 is provided on an optical path of the light L31, which is incident light, as in a case where the cell C1 is used to modulate the phase of the light L11. The transmission axis A31 of the polarizing plate P31 is oriented parallel to the x-axis direction in the xy plane as illustrated in (a) of FIG. 22. Thus, the polarizing plate P31 (*i*) transmits only linearly polarized light that is included in components of the light L31 and whose polarization direction is parallel to an x axis and (ii) causes the linearly polarized light to enter the optically effective surface C371.

In the cell C3 thus configured, the direction of the magnetization M33 (the y-axis direction) is orthogonal or substantially orthogonal to the polarization direction of the light L31 (the x-axis direction) as in the case of the cell C1 (see (b) of FIG. 22). Thus, the cell C3, in which interaction with the magnetization M33 causes a transverse Kerr effect to the light L31, can modulate the phase of the light L31. That is, the cell C3 is a spin injection type phase shift modulator.

(Intensity Modulation)

In the cell C4, a polarizing plate P41 is provided on an optical path of the light L41, which is incident light, and a polarizing plate P42 is provided on an optical path of light L42, which is outgoing light. A transmission axis A41 of the polarizing plate P41 and a transmission axis A42 of the polarizing plate P42 are oriented parallel to the x-axis direction in the xy plane as illustrated in (a) of FIG. 20. Thus, the polarizing plate P41 (*i*) transmits only linearly polarized light that is included in components of the light L41 and whose polarization direction is parallel to the x axis and (ii) causes the linearly polarized light to enter an optically effective surface C471. Similarly, the polarizing plate P41 transmits only linearly polarized light that is included in components of the light L42 having outgone from the optically effective surface C471 and whose polarization direction is parallel to the x axis.

In the cell C4 thus configured, a direction of magnetization M43 (the z-axis direction) is substantially orthogonal to a polarization direction of the light L41 (the x-axis direction) as in the case of the cell C2 (see (b) of FIG. 23). In other words, since the direction of the magnetization M45 (z-axis direction) is substantially parallel to the traveling direction of the light L41, interaction with the magnetization M43 causes the polar Kerr effect to the light L41, so that the intensity of incident light can be modulated. That is, the cell C4 is a spin injection type intensity modulator.

[Specific Examples 5 and 6 of Cell]

Figures 24A, 24B, 24C, 24D, 24E, 24F:
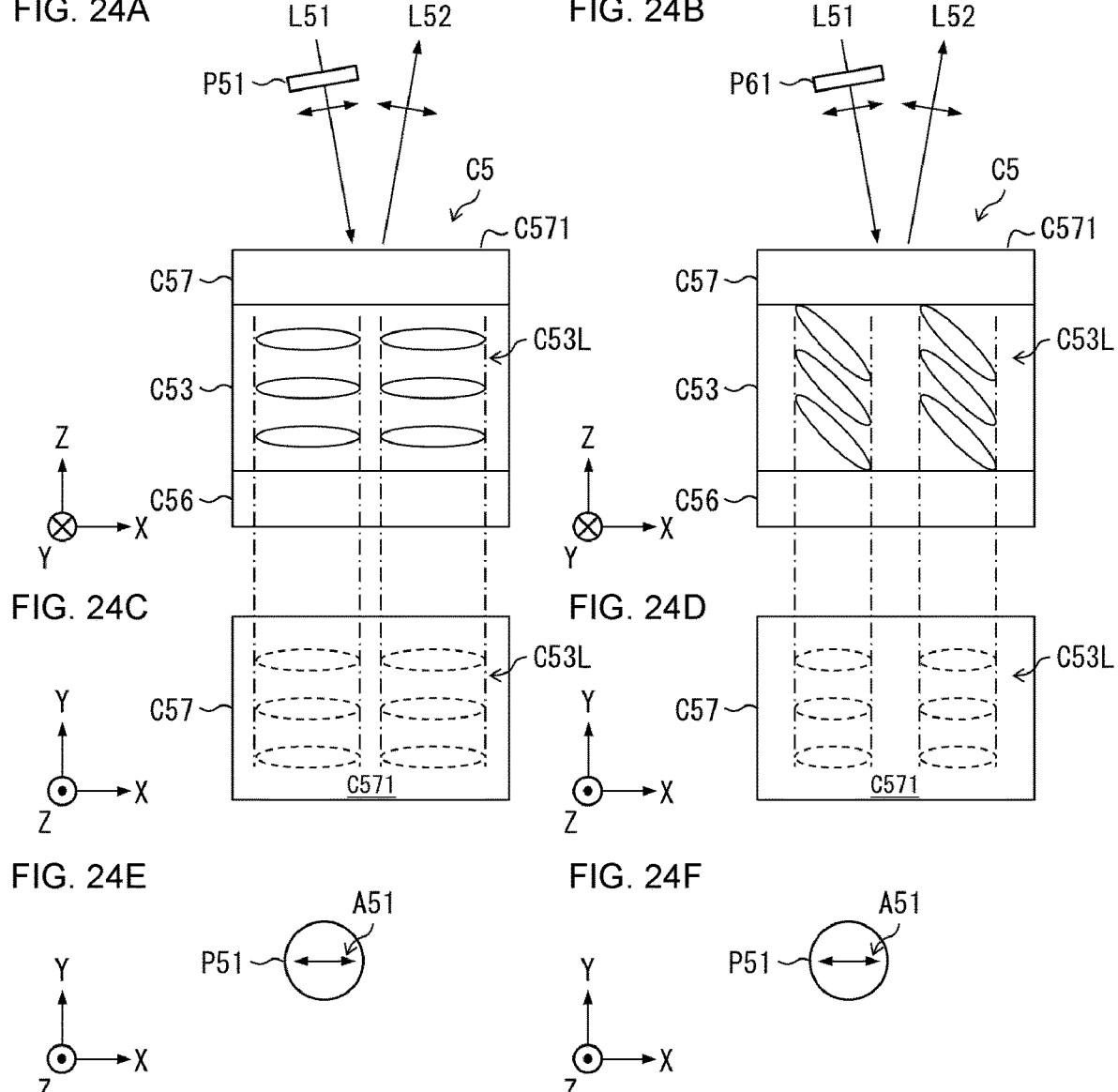
FIGS. 24A and 24B are cross-sectional views of Specific Example 5 of the cell according to one or more embodiments.
FIGS. 24C and 24D are plan views of Specific Example 5 of the cell.
FIGS. 24E and 24F are plan views of a polarizing plate.
Figures 25A, 25B, 25C, 25D, 25E, 25F:
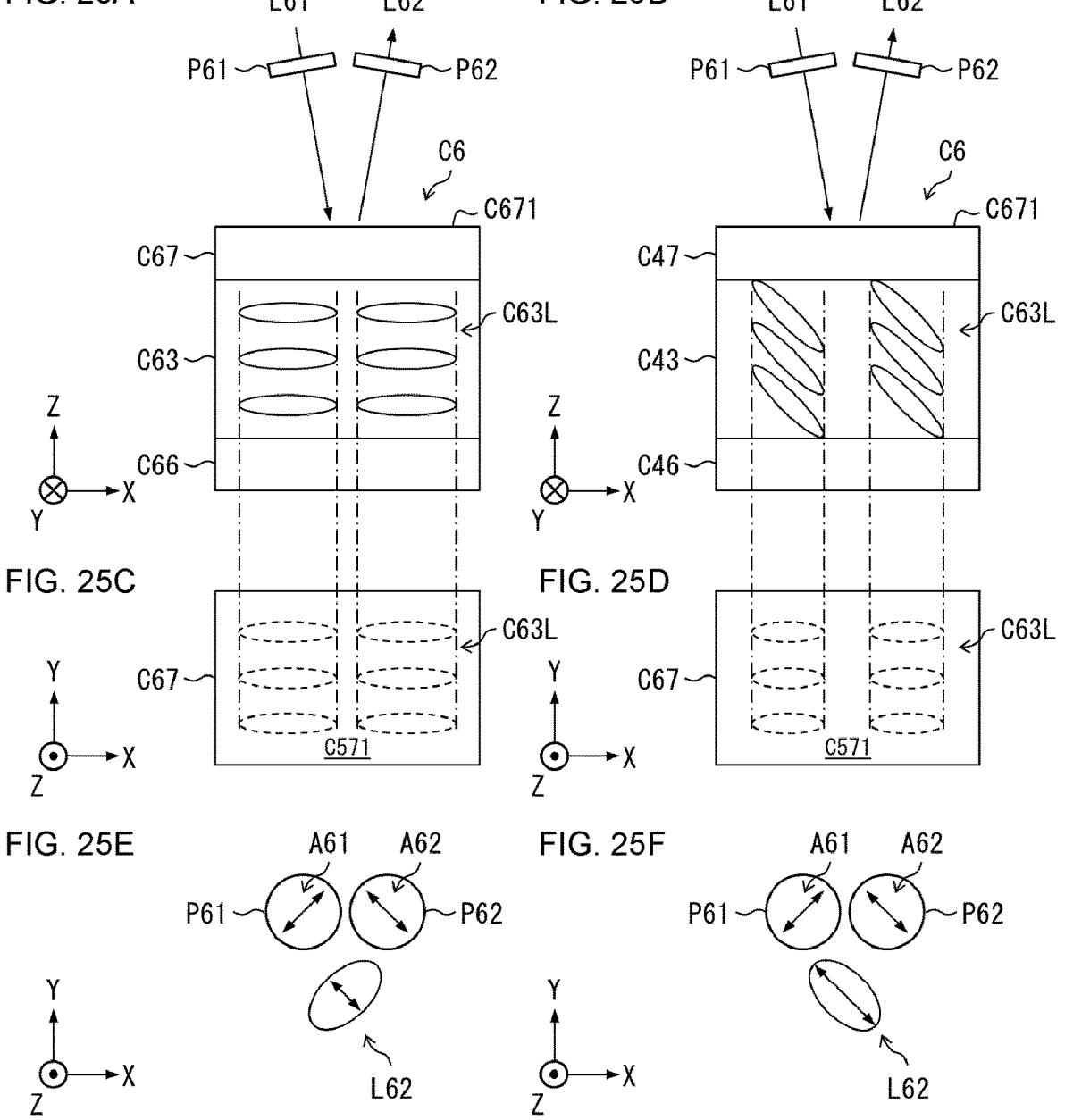
FIGS. 25A and 25B are cross-sectional views of Specific Example 6 of the cell according to one or more embodiments.
FIGS. 25C and 25D are plan views of Specific Example 6 of the cell.
FIGS. 25E and 25F are plan views of a polarizing plate.

The following description will discuss, with reference to FIG. 24, a cell C5, which is Specific Example 5 of the cell C, C', C''. (a) and (b) of FIG. 24 are cross-sectional views of the cell C5. (c) and (d) of FIG. 24 are plan views of the cell C5. (e) and (f) of FIG. 24 are plan views of a polarizing plate P51, the plan views each illustrating a direction of a transmission axis A51 of the polarizing plate P51. The following description will discuss, with reference to FIG. 25, a cell C6, which is Specific Example 6 of the cell C. (a) and (b) of FIG. 25 are cross-sectional views of the cell C6. (c) and (d) of FIG. 25 are plan views of the cell C6. (e) and (f) of FIG. 25 are plan views of polarizing plates P61 and P62, the plan views each illustrating directions of respective transmission axes A61 and A62 of the polarizing plates P61 and P62. Note that (e) and (f) of FIG. 25 schematically illustrate how light L62 that has outgone from an optically effective surface C571 and has not been transmitted through the polarizing plate P62 is polarized.

(Configuration of Cell)

The cell C5 is liquid crystal on silicon (LCOS) including a substrate made of silicon (not illustrated in FIG. 24), a liquid crystal layer C53, an electrode C56, and an electrode C57. The electrode C56, the liquid crystal layer C53, and the electrode C57 are disposed in this order on one of main surfaces of the substrate. FIG. 24 illustrates only the electrode C56, the liquid crystal layer C53, and the electrode C57 that are disposed on the substrate.

As in the case of the electrode C16 of the cell C1, the electrode C56 is a layer member that is made of a conductor. The electrode C56 functions as a lower electrode of the LCOS.

As in the case of the electrode C37 of the cell C3, the electrode C57 is made of a transparent electrically conductive film. In the cell C5, light (i) enters via the optically effective surface C571, which is a z-axis positive direction side main surface of the electrode C57, and (ii) outgoes.

The liquid crystal layer C53 includes a plurality of liquid crystal molecules C53L as illustrated in (a) to (d) of FIG. 24. Since the liquid crystal layer C53 is sandwiched between the electrode C56 and the electrode C57, the electrode C56 and the electrode C57 can be used to control an electric field to be applied to the liquid crystal layer C53. In the cell C5, an alignment direction of the liquid crystal molecules C53L can be controlled by controlling the electric field to be applied to the liquid crystal layer C53.

Note that the cell C5 illustrated in FIG. 24 and the cell C6 illustrated in FIG. 25 merely differ in purpose and method of use and are identical in structure. That is, a liquid crystal layer C63, an electrode C66, and an electrode C57 of the cell C6 are identical in structure to the liquid crystal layer C53, the electrode C56, and the electrode C57, respectively, of the cell C5.

(Phase Modulation)

(a) and (c) of FIG. 24 each illustrate a first state in which the liquid crystal molecules C53L are aligned parallel to the x-axis direction. In contrast, (b) and (d) of FIG. 24 each illustrate a second state in which the liquid crystal molecules C53L are aligned at an inclination of approximately 450 from the x-axis direction to a clockwise direction.

As illustrated in (a) and (b) of FIG. 24, in the cell C5, light L51 enters the optically effective surface C571 from a direction inclined, by an incidence angle, from the z-axis direction perpendicular to the optically effective surface C571 to the x-axis negative direction. Note that the polarizing plate P51 is provided so as to be followed by the cell C5 when viewed from the light L51. Light that has entered the optically effective surface 571 propagates through the inside of the liquid crystal layer C53 in a direction toward the electrode C56 (approximately the z-axis negative direction), is reflected at a boundary surface between the liquid crystal layer C53 and the electrode C56, and propagates through the inside of the liquid crystal layer C53 in a direction toward the optically effective surface C571 (approximately the z-axis positive direction), and outgoes, as light L52, from the optically effective surface C571. The light L52 outgoes, from the optically effective surface C571, in a direction inclined, by an outgoing angle corresponding to the incidence angle, from the z-axis direction perpendicular to the optically effective surface C571 to the x-axis negative direction. Note that (b) of FIG. 24 does not illustrate an optical path inside the liquid crystal layer C53. In Specific Example 5, the incidence angle and the outgoing angle are each 10°. Note, however, that the incidence angle and the outgoing angle, neither of which is limited to 10°, can be determined as appropriate.

In a case where the cell C5 is used to modulate a phase of the light L51, the polarizing plate P51 is provided on an optical path of the light L51, which is incident light, as in the case where the cell C1 is used to modulate the phase of the light L11. The transmission axis A51 of the polarizing plate P51 is oriented parallel to the x-axis direction in the xy plane as illustrated in (e) and (f) of FIG. 24. Thus, the polarizing plate P51 (i) transmits only linearly polarized light that is included in components of the light L51 and whose polarization direction is parallel to the x axis and (ii) causes the linearly polarized light to enter the optically effective surface C571.

In the first state illustrated in each of (a) and (c) of FIG. 24, since a polarization direction of light that propagates through the inside of the liquid crystal layer C53 and the alignment direction of the liquid crystal molecules C53L substantially coincide with each other, the phase of the light is hardly affected by the liquid crystal molecules C53L.

In contrast, in the second state illustrated in each of (b) and (d) of FIG. 24, since the alignment direction of the liquid crystal molecules C53L inclines with respect to the polarization direction of the light that propagates through the inside of the liquid crystal layer C53, the phase of the light is delayed by being affected by the liquid crystal molecules C53L.

In the cell C5 thus configured, a degree of delay in phase of the light can be controlled by controlling the magnitude of an angle formed between (a) the polarization direction of the light that propagates through the inside of the liquid crystal layer C53 and (b) the alignment direction of the liquid crystal molecules C53L. That is, the cell C5, which can modulate the phase of the light L51, is an LCOS type phase shift modulator.

(Intensity Modulation)

In the cell C6, the polarizing plate P61 is provided on an optical path of light L61, which is incident light, and the polarizing plate P62 is provided on an optical path of the light L62, which is outgoing light. The transmission axis A61 of the polarizing plate P61 is oriented in a direction that is rotated by 45° from the x-axis direction to a counterclockwise direction in the xy plane as illustrated in (e) and (f) of FIG. 25. In contrast, the transmission axis A62 of the polarizing plate P62 is oriented in a direction that is rotated by 45° from the x-axis direction to the clockwise direction in the xy plane as illustrated in (e) and (f) of FIG. 25.

In a case where the light L61 having been transmitted through the polarizing plate P61 propagates through the inside of the liquid crystal layer C63 that is in the first state, the light changes from linearly polarized light to elliptically polarized light as illustrated in (e) of FIG. 25. Assume here that the elliptically polarized light has (i) a major axis that is parallel to the transmission axis A61 of the polarizing plate P61 and (ii) a minor axis that is parallel to the transmission axis A62 of the polarizing plate P62. In this case, a component of light that can be transmitted through the polarizing plate P62 is a component that is parallel to the transmission axis A62, i.e., a component that is parallel to the minor axis of the elliptically polarized light. Thus, in a case where liquid crystal molecules C63L are in the first state, the cell C6 can greatly attenuate the intensity of the light L62 that outgoes from the polarizing plate P62.

In contrast, in a case where the light L61 having been transmitted through the polarizing plate P61 propagates through the inside of the liquid crystal layer C63 that is in the second state, the light changes from linearly polarized light to elliptically polarized light as illustrated in (f) of FIG. 25. Assume here that the elliptically polarized light has (i) a major axis that is parallel to the transmission axis A61 of the polarizing plate P61 and (ii) a minor axis that is parallel to the transmission axis A62 of the polarizing plate P62. In this case, a component of light that can be transmitted through the polarizing plate P62 is a component on the minor axis that is parallel to the transmission axis A62 a component that is parallel to the transmission axis A62, i.e., a component that is parallel to the minor axis of the elliptically polarized light. Assume that as compared with a case where light propagates through the inside of the liquid crystal layer C63 that is in the first state, a polarization direction of the elliptically polarized light is rotated by 90°, and elliptically polarized light has a major axis that is parallel to the transmission axis A62 of the polarizing plate P62. Thus, in a case where the liquid crystal molecules C63L are in the second state, the cell C6 hardly attenuates the intensity of the light L62 that outgoes from the polarizing plate P62.

In the cell C6 thus configured, the intensity of the light L61 can be modulated by controlling the polarization direction of the elliptically polarized light that is generated by propagation through the inside of the liquid crystal layer C63. Thus, the cell C6 is an LCOS type intensity modulator.

Further Specific Example of Cell

Further specific examples of the cell C, C', C" include a DMD type intensity modulator in which a digital micromirror device (DMD) is used. The DMD, which can switch an inclination of a micromirror between two states, can modulate the intensity of light in a case where attention is paid to a predetermined outgoing direction.

Embodiments of the present invention can also be expressed as follows:

An optical computing device in accordance with one or more embodiments of the present invention includes: an optical modulation element including a plurality of cells in which modulation amounts are independently configurable; and a reflector, N (N is a natural number not less than 2) computing regions A1, A2, . . . , AN being configured for the optical modulation element, the computing region A1 carrying out optical computing by modulating and reflecting incident light, and each computing region Ai (i is a corresponding natural number not less than 2 and not more than N) other than the computing region A1 carrying out the optical computing by modulating and reflecting signal light that has been modulated and reflected by a computing region Ai−1 and then reflected by the reflector.

An optical computing device in accordance with one or more embodiments of the present invention employs, in addition to the configuration of the above-described embodiments, a configuration such that the optical computing device further includes a control section configured to control, in accordance with signal light that has been modulated and reflected by at least one computing region An (n is any natural number not less than 1 and not more than N), the modulation amounts in the cells included in the optical modulation element.

An optical computing device in accordance with one or more embodiments of the present invention employs, in addition to the configuration of the above-described embodiments, a configuration such that the optical computing device further includes a medium that is provided between the optical modulation element and the reflector and that has a higher or lower refractive index than air.

An optical computing device in accordance with one or more embodiments of the present invention employs, in addition to the configuration of the above-described embodiments, a configuration such that the optical computing device further includes a medium that is provided between the optical modulation element and the reflector and that has a higher or lower refractive index in a region through which signal light having been modulated and reflected by the each computing region Ai passes than in a region through which signal light having been modulated and reflected by the computing region Ai−1 passes.

An optical computing device in accordance with one or more embodiments of the present invention employs, in addition to the configuration of the above-described embodiments, a configuration such that the reflector is provided so that a distance from the reflector to the optical modulation element is greater or smaller in a region through which the signal light having been modulated and reflected by the each computing region Ai passes than in a region through which the signal light having been modulated and reflected by the computing region Ai−1 passes.

An optical computing device in accordance with one or more embodiments of the present invention employs, in addition to the configuration of the above-described embodiments, a configuration such that the at least one computing region An (n is any natural number not less than 1 and not more than N) reflects incident light or signal light, which enters the computing region An, so that an incidence angle and a reflection angle with respect to a normal line to a surface of the optical modulation element differ from each other, or so that an incidence plane containing the normal line and an incidence optical axis and a reflection plane containing the normal line and a reflection optical axis differ from each other.

An optical computing device in accordance with one or more embodiments of the present invention employs, in addition to the configuration of the above-described embodiments, a configuration such that the incident light is signal light that has been modulated by an input signal.

An optical computing device in accordance with one or more embodiments of the present invention employs, in addition to the configuration of the above-described embodiments, a configuration such that the incident light is carrier light that has not been modulated by an input signal, and the computing region A1 uses the input signal to modulate the carrier light so as to carry out the optical computing to generate signal light.

An optical computing device in accordance with one or more embodiments of the present invention employs, in addition to the configuration of the above-described embodiments, a configuration such that the optical computing device further includes a demultiplexer configured to demultiplex the incident light in accordance with a wavelength, each computing region Aj (j is a corresponding natural number not less than 1 and not more than N) having been divided into small regions that modulate and reflect signal light having different wavelengths.

An optical computing device in accordance with one or more embodiments of the present invention employs, in addition to the configuration of the above-described embodiments, a configuration such that the demultiplexer is a diffraction grating that is provided on the optical modulation element.

An optical computing device in accordance with one or more embodiments of the present invention employs, in addition to the configuration of the above-described embodiments, a configuration such that the optical computing device further includes a multiplexer configured to multiplex signal light having different wavelengths and having been modulated and reflected in the small regions constituting the computing region AN.

An optical computing device in accordance with one or more embodiments of the present invention employs, in addition to the configuration of the above-described embodiments, a configuration such that the multiplexer is a diffraction grating that is provided on the optical modulation element.

An optical computing device in accordance with one or more embodiments of the present invention employs, in addition to the configuration of the above-described embodiments, a configuration such that a distance between the optical modulation element and the reflector is variable.

An optical computing device in accordance with one or more embodiments of the present invention employs, in addition to the configuration of the above-described embodiments, a configuration such that at least one computing region An (n is any natural number not less than 1 and not more than N) is covered by a polarizing filter that selectively transmits a polarized light component of incident light or signal light, the polarized light component having a specific polarization direction.

An optical computing device in accordance with one or more embodiments of the present invention employs, in addition to the configuration of the above-described embodiments, a configuration such that the optical computing device further includes an optical absorber configured to prevent, for at least one set of computing regions Am and Am+1 (m is any natural number not less than 1 and not more than N−1), signal light having been modulated and reflected by the computing region Am from entering a cell different from a cell constituting the computing region Am+1.

An optical computing device in accordance with one or more embodiments of the present invention employs, in addition to the configuration of the above-described embodiments, a configuration such that the reflector is a mirror configured to reflect signal light without modulating the signal light, the signal light having been modulated and reflected by each computing region Ak (k is a corresponding natural number not less than 1 and not more than N−1) other than the computing region AN.

An optical computing device in accordance with one or more embodiments of the present invention employs, in addition to the configuration of the above-described embodiments, a configuration such that the optical computing device further includes a light receiving section configured to detect signal light having been modulated and reflected by the computing region AN.

An optical computing device in accordance with one or more embodiments of the present invention employs, in addition to the configuration of the above-described embodiments, a configuration such that the mirror is a semi-transparent mirror configured to partially transmit signal light having been modulated and reflected by at least one computing region Am (m is any natural number not less than 1 and not more than N−1), and the light receiving section further detects signal light having been modulated and reflected by the computing region Am and transmitted through the semi-transparent mirror, or the optical computing device further includes another light receiving section configured to detect signal light having been modulated and reflected by the computing region Am and transmitted through the semi-transparent mirror.

An optical computing device in accordance with one or more embodiments of the present invention employs, in addition to the configuration of the above-described embodiments, a configuration such that the reflector is another optical modulation element including a plurality of cells in which modulation amounts are configurable independently of each other, N−1 computing regions A1', A2', . . . , AN−1' are configured for the another optical modulation element, and each computing region Ak' (k is a corresponding natural number not less than 1 and not more than N−1) of the another optical modulation element carries out the optical computing by modulating and reflecting signal light having been modulated and reflected by the computing region Ak of the optical modulation element.

An optical computing device in accordance with one or more embodiments of the present invention employs, in addition to the configuration of the above-described embodiments, a configuration such that the optical computing device further includes: a prism; and a light receiving section, the optical modulation element being provided so as to face a first surface of the prism, the another optical modulation element being provided so as to face a second surface of the prism, the prism having a third surface that (1) partially reflects signal light having been modulated and reflected by the each computing region Ak of the optical modulation element and guides the partially reflected signal light to the computing region Ak' of the another optical modulation element and (2) partially reflects signal light having been modulated and reflected by the each computing region Ak' of the another optical modulation element and guides the partially reflected signal light to a computing region Ak+1 of the optical modulation element, and the light receiving section detecting (i) signal light having been modulated and reflected by the each computing region Ak of the optical modulation element and transmitted through the third surface and (ii) a signal having been modulated and reflected by the each computing region Ak' of the another optical modulation element and transmitted through the third surface.

An optical computing device in accordance with one or more embodiments of the present invention employs, in addition to the configuration of the above-described embodiments, a configuration such that the reflector is composed of two other optical modulation elements each including a plurality of cells in which modulation amounts are configurable independently of each other, N−1 computing regions A1', A2', . . . , AN−1' are configured for one (the first) of the two other optical modulation elements, each computing region Ak' (k is a corresponding natural number not less than 1 and not more than N−1) of the other one of the two other optical modulation elements carries out the optical computing by modulating and reflecting signal light having been modulated and reflected by the computing region Ak of the optical modulation element, N−1 computing regions A1", A2", . . . , AN−1" are configured for the other one (the second) of the two other optical modulation elements, and each computing region Ak" of the other one of the two other optical modulation elements carries out the optical computing by modulating and reflecting signal light having been modulated and reflected by the computing region Ak' of the one of the two other optical modulation elements.

An optical computing device in accordance with one or more embodiments of the present invention employs, in addition to the configuration of the above-described embodiments, a configuration such that the optical computing device further includes: a prism; and a light receiving section, the optical modulation element being provided so as to face a first surface of the prism, the one of the two other optical modulation elements being provided so as to face a second surface of the prism, the other one of the two other optical modulation elements being provided so as to face a third surface of the prism, the prism having a fourth surface that (1) partially reflects signal light having been modulated and reflected by the each computing region Ak of the optical modulation element and guides the partially reflected signal light to the computing region Ak' of the one of the two other optical modulation elements, (2) partially reflects signal light having been modulated and reflected by the each computing region Ak' of the other one of the two other optical modulation elements and guides the partially reflected signal light to the computing region Ak" of the other one of the two other optical modulation elements, and (3) partially reflects signal light having been modulated and reflected by the each computing region Ak" of the other one of the two other optical modulation elements and guides the partially reflected signal light to a computing region Ak+1 of the optical modulation element, and the photodetector detecting (i) signal light having been modulated and reflected by the each computing region Ak of the optical modulation element and transmitted through the fourth surface, (ii) signal light having been modulated and reflected by the each computing region Ak' of the one of the two other optical modulation elements and transmitted through the fourth surface, and (iii) signal light having been modulated and reflected by the each computing region Ak" of the other one of the two other optical modulation elements and transmitted through the fourth surface.

An optical computing device in accordance with one or more embodiments of the present invention employs, in addition to the configuration of the above-described embodiments, a configuration such that each cell constituting at least one computing region An' (n is any natural number not less than 1 and not more than N) of the two other optical modulation elements reflects signal light, which enters the computing region An', so that an incidence angle and a reflection angle with respect to a normal line to a surface of the optical modulation element differ from each other, or so that an incidence plane containing the normal line and an incidence optical axis and a reflection plane containing the normal line and a reflection optical axis differ from each other.

An optical computing device in accordance with one or more embodiments of the present invention employs, in addition to the configuration of the above-described embodiments, a configuration such that each of the plurality of cells is a spin injection type phase modulator or a spin injection type intensity modulator.

An optical computing device in accordance with one or more embodiments of the present invention employs, in addition to the configuration of the above-described embodiments, a configuration such that each of the plurality of cells is an LCOS type phase modulator or an LCOS type intensity modulator.

An optical computing device in accordance with one or more embodiments of the present invention employs, in addition to the configuration of the above-described embodiments, a configuration such that each of the plurality of cells is a DMD type intensity modulator.

An optical computing method in accordance with one or more embodiments of the present invention is an optical computing method carried out by using an optical modulation element (i) that includes a plurality of cells in which modulation amounts are independently configurable and (ii) for which N (N is a natural number not less than 2) computing regions A1, A2, . . . , AN are configured, the optical computing method including: using the computing region A1 to carry out optical computing by modulating and reflecting incident light; and using each computing region Ai (i is a corresponding natural number not less than 2 and not more than N) other than the computing region A1 to carry out the optical computing by modulating and reflecting signal light that has been modulated and reflected by a computing region Ai-1 and then reflected by a reflector.

[Additional Remarks]

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 Optical computing device
11 Optical modulation element
12 Mirror
12a Semi-transparent mirror
13 Light emitting section
14 Light receiving section
Control section
16 Medium
17 Demultiplexer
18 Multiplexer
19 Polarizing filter
2 Optical computing device
21 First optical modulation element
22 Second optical modulation element
23 Light emitting section
24 Light receiving section
Control section
26 Prism
27 Optical absorber
28 Third optical modulation element
29 Prism
A1, A2, . . . , AN Computing region
A1', A2', . . . , AN-1' Computing region
A1", A2", . . . , AN-1" Computing region
L1, L2, . . . , LN Signal light
L1', L2', . . . , LN' Signal light
L1", L2", . . . , LN" Signal light

The invention claimed is:

1. An optical computing device comprising:
an optical modulation element including cells with independently configurable amounts of modulation; and
a reflector, wherein
the optical modulation element is configured with N-computing regions A1, A2, . . . , AN, where N is a natural number not less than 2,
the computing region A1 modulates and reflects incident light to generate signal light L1 indicative of a result of optical computing, and
each computing region Ai, where i is a corresponding natural number not less than 2 and not more than N, other than the computing region A1 modulates and reflects signal light Li-1 that has been modulated and reflected by a computing region Ai-1 and then reflected by the reflector to generate signal light Li indicative of a result of optical computing.

2. The optical computing device as set forth in claim 1, further comprising a control section that controls the modulation amounts in the cells of the optical modulation element in accordance with signal light Ln that has been modulated and reflected by at least one computing region An, where n is any natural number not less than 1 and not more than N.

3. The optical computing device as set forth in claim 1, further comprising:
a medium disposed between the optical modulation element and the reflector, wherein
the medium has a higher or lower refractive index than air.

4. The optical computing device as set forth in claim 1, further comprising:
a medium disposed between the optical modulation element and the reflector, wherein
the medium has a higher or lower refractive index in a region through which signal light Li having been modulated and reflected by the each computing region Ai passes than in a region through which signal light Li-1 having been modulated and reflected by the computing region Ai-1 passes.

5. The optical computing device as set forth in claim 1, wherein the reflector is disposed such that a distance from the reflector to the optical modulation element is greater or smaller in a region through which signal light Li having been modulated and reflected by the each computing region Ai passes than in a region through which signal light Li-1 having been modulated and reflected by the computing region Ai-1 passes.

6. The optical computing device as set forth in claim 1, wherein at least one computing region An, where n is any natural number not less than 1 and not more than N, reflects incident light or signal light Ln, which enters the computing region An, so that an incidence angle and a reflection angle with respect to a normal line to a surface of the optical modulation element differ from each other, or so that an incidence plane containing the normal line and an incidence optical axis is different from a reflection plane containing the normal line and a reflection optical axis.

7. The optical computing device as set forth in claim 1, wherein the incident light is signal light L0 that has been modulated by an input signal.

8. The optical computing device as set forth in claim 1, wherein
the incident light is carrier light that has not been modulated by an input signal, and
the computing region A1 uses an input signal to modulate the carrier light so as to carry out the optical computing to generate signal light Li.

9. The optical computing device as set forth in claim 1, further comprising:
a demultiplexer that demultiplexes the incident light in accordance with a wavelength, wherein
each computing region Aj, where j is a corresponding natural number not less than 1 and not more than N, is divided into small regions that modulate and reflect signal light Lj-1 having different wavelengths.

10. The optical computing device as set forth in claim 9, wherein the demultiplexer is a diffraction grating that is disposed on the optical modulation element.

11. The optical computing device as set forth in claim 9, further comprising a multiplexer that multiplexes signal light LN having different wavelengths and having been modulated and reflected in the small regions constituting the computing region AN.

12. The optical computing device as set forth in claim 11, wherein the multiplexer is a diffraction grating that is disposed on the optical modulation element.

13. The optical computing device as set forth in claim 1, wherein a distance between the optical modulation element and the reflector is variable.

14. The optical computing device as set forth in claim 1, wherein at least one computing region An, where n is any natural number not less than 1 and not more than N, is covered by a polarizing filter that selectively transmits a polarized light component of incident light or signal light Ln−1, the polarized light component having a specific polarization direction.

15. The optical computing device as set forth in claim 1, further comprising an optical absorber that prevents, for at least one set of computing regions Am and Am+1, signal light Lm having been modulated and reflected by the computing region Am from entering a cell different from a cell constituting the computing region Am+1, where m is any natural number not less than 1 and not more than N−1.

16. The optical computing device as set forth in claim 1, wherein the reflector is a mirror that reflects signal light Lk without modulating the signal light Lk, the signal light Lk having been modulated and reflected by each computing region Ak, where k is a corresponding natural number not less than 1 and not more than N−1, other than the computing region AN.

17. The optical computing device as set forth in claim 16, further comprising a light receiving section that detects signal light LN having been modulated and reflected by the computing region AN.

18. The optical computing device as set forth in claim 17, wherein the mirror is a semi-transparent mirror that partially transmits signal light Lm having been modulated and reflected by at least one computing region Am, where m is any natural number not less than 1 and not more than N−1, and the light receiving section further detects signal light Lm having been modulated and reflected by the computing region Am and transmitted through the semi-transparent mirror, or the optical computing device further includes another light receiving section configured to detect signal light Lm having been modulated and reflected by the computing region Am and transmitted through the semi-transparent mirror.

19. The optical computing device as set forth in claim 1, wherein each of the cells is a spin injection type phase modulator or a spin injection type intensity modulator.

20. The optical computing device as set forth in claim 1, wherein each of the cells is an LCOS (liquid crystal on silicon) type phase modulator or an LCOS type intensity modulator.

21. The optical computing device as set forth in claim 1, wherein each of the cells is a DMD (digital micromirror device) type intensity modulator.

22. An optical computing method carried out by using an optical modulation element that includes with independently configurable amounts of modulation and for which N computing regions A1, A2, . . . , AN are configured, where N is a natural number not less than 2, the optical computing method comprising:

using the computing region A1 to modulate and reflect incident light to generate signal light L1 indicative of a result of optical computing; and using each computing region Ai, where i is a corresponding natural number not less than 2 and not more than N, other than the computing region A1 to modulate and reflect signal light Li−1 that has been modulated and reflected by a computing region Ai−1 and then reflected by a reflector to generate signal light Li indicative of a result of optical computing.

* * * * *